US011251882B2

United States Patent
Dao et al.

(10) Patent No.: US 11,251,882 B2
(45) Date of Patent: Feb. 15, 2022

(54) DEVICE AND METHOD FOR CALIBRATING PHASED ARRAY ANTENNA

(71) Applicant: Samsung Electronics Co., Ltd, Suwon-si (KR)

(72) Inventors: Manh-Tuan Dao, Seoul (KR); Yonghoon Kim, Suwon-si (KR); Yuichi Aoki, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 52 days.

(21) Appl. No.: 16/641,207

(22) PCT Filed: Dec. 15, 2017

(86) PCT No.: PCT/KR2017/014799
§ 371 (c)(1),
(2) Date: Feb. 21, 2020

(87) PCT Pub. No.: WO2019/039671
PCT Pub. Date: Feb. 28, 2019

(65) Prior Publication Data
US 2020/0228211 A1    Jul. 16, 2020

(30) Foreign Application Priority Data

Aug. 23, 2017    (KR) .......................... 10-2017-0106751

(51) Int. Cl.
*H04B 17/12*    (2015.01)
*H04B 17/10*    (2015.01)
*H04B 7/06*    (2006.01)

(52) U.S. Cl.
CPC .............. *H04B 17/12* (2015.01); *H04B 7/06* (2013.01); *H04B 17/104* (2015.01)

(58) Field of Classification Search
CPC .... H04B 17/101; H04B 17/104; H04B 17/13; H04B 17/19; H04B 17/391; H04B 17/26;
(Continued)

(56) References Cited

U.S. PATENT DOCUMENTS

| 5,861,843 A | 1/1999 | Sorace et al. |
| 6,175,327 B1 * | 1/2001 | Lin ...................... H01Q 3/2611 |
| | | 342/357.64 |

(Continued)

FOREIGN PATENT DOCUMENTS

| CN | 101483273 A | 7/2009 |
| EP | 2 722 928 A1 | 4/2014 |

(Continued)

OTHER PUBLICATIONS

Timsina, R., A Miniaturized Phased Array Antenna Based on Novel Switch Line Phase Shifter Module, 2019, (Order No. 13881501). Available from ProQuest Dissertations and Theses Professional. (2280662761). Retrieved from https://dialog.proquest.com/professional/docview/2280662761?accountid=131444 (Year: 2019).*

(Continued)

*Primary Examiner* — Lana N Le

(57) ABSTRACT

The present disclosure relates to a pre-$5^{th}$-Generation (5G) or 5G communication system to be provided for supporting higher data rates beyond $4^{th}$-Generation (4G) communication system such as long-term evolution (LTE). The present disclosure provides a device and a method for calibrating a phased array antenna. A method for calibrating a phased array antenna according to various embodiments of the disclosure comprises the processes of: controlling a first radio frequency (RF) chain so as to transmit a first signal at a first phase, thereby determining the phase difference between the first phase and a reference phase; controlling the first RF chain so as to transmit a second signal at a second phase, thereby determining the phase condition of the phase (Continued)

difference; and calibrating the first RF chain on the basis of the phase difference and the phase condition. The reference phase may be the phase of a reference signal transmitted from a reference RF chain. Accordingly, the time necessary for calibration may be reduced, and mass production of phased array antennas may be facilitated. The present research has been financed by the Korean government (Ministry of Science and ICT) in 2017 and conducted with the support of "Intra-ministry Giga Korean Project" (No. GK17N0100, Millimeter-wave 5G Mobile Communication System Development).

20 Claims, 20 Drawing Sheets

(58) Field of Classification Search
CPC .............. H04B 17/309; H04B 17/3911; H04B 17/3912; H04B 7/015; H04B 7/024; H04B 7/0408; H04B 7/0417; H04B 7/0421; H04B 7/043; H04B 7/046; H04B 7/084; H04B 7/02; H04B 7/04; H04B 7/0469; H04B 7/0671; H04B 7/0678; H04B 7/0817; H04B 7/0825; H04B 7/0894; H04B 10/613; H04B 17/12; H04B 17/21; H04B 1/712; H04B 7/0865; H04B 7/0871; H04B 7/0617; H04B 7/0639; H01Q 3/36; H01Q 3/267; H04L 27/26; H04L 27/2601; H04L 25/0206; H04L 7/033; H04L 25/0204; H04L 27/2613; H04L 7/04
See application file for complete search history.

(56) References Cited

U.S. PATENT DOCUMENTS

| | | | |
|---|---|---|---|
| 7,082,171 B1* | 7/2006 | Johnson | H03D 7/00 375/260 |
| 7,482,976 B2 | 1/2009 | Plesinger | |
| 7,986,755 B2* | 7/2011 | Tung | H04B 7/0417 375/346 |
| 8,737,929 B2 | 5/2014 | Cohen et al. | |
| 8,957,808 B2 | 2/2015 | Ookawa | |
| 9,736,790 B1* | 8/2017 | Haub | H04B 17/0085 |
| 10,056,685 B2 | 8/2018 | Haddad et al. | |
| 10,094,914 B2* | 10/2018 | Boe | G01S 7/4017 |
| 10,498,029 B1* | 12/2019 | Tran | F21S 8/086 |
| 2003/0098809 A1* | 5/2003 | Lindskog | H04B 17/21 342/174 |
| 2006/0111050 A1* | 5/2006 | Choi | H01Q 3/267 455/67.11 |
| 2007/0069945 A1 | 3/2007 | Weese | |
| 2007/0183479 A1* | 8/2007 | Noll | H04B 17/21 375/132 |
| 2009/0153394 A1 | 6/2009 | Navarro et al. | |
| 2012/0033571 A1* | 2/2012 | Shimezawa | H04B 7/0689 370/252 |
| 2012/0033761 A1* | 2/2012 | Guo | G01S 3/023 375/316 |
| 2014/0370823 A1* | 12/2014 | Yu | H04B 17/14 455/73 |
| 2018/0316093 A1* | 11/2018 | Sharvit | H01Q 3/36 |
| 2019/0148829 A1* | 5/2019 | Ananth | H01Q 3/267 342/174 |
| 2020/0380326 A1* | 12/2020 | Kawaguchi | G06K 19/0709 |

FOREIGN PATENT DOCUMENTS

| | | | |
|---|---|---|---|
| EP | 2975781 A1 | 1/2016 | |
| KR | 10-2015-0105235 A | 9/2015 | |
| WO | WO-2015142723 A1 * | 9/2015 | ......... H01Q 21/0031 |

OTHER PUBLICATIONS

Supplementary European Search Report dated Jul. 9, 2020 in connection with European Patent Application No. 17 92 2292, 11 pages.
International Search Report dated May 15, 2018 in connection with International Patent Application No. PCT/KR2017/014799, 2 pages.
Written Opinion of the International Searching Authority dated May 15, 2018 in connection with International Patent Application No. PCT/KR2017/014799, 6 pages.
Communication pursuant to Article 94(3) EPC dated Dec. 2, 2020 in connection with European Application No. 17922292.2, 7 pages.
Communication pursuant to Article 94(3) EPC dated May 26, 2021, in connection with European Patent Application No. 17922292.2, 7 pages.
Notice of Preliminary Rejection dated Jul. 16, 2021, in connection with Korean Patent Application No. 10-2017-0106751, 9 pages.

* cited by examiner

DEVICE AND METHOD FOR CALIBRATING PHASED ARRAY ANTENNA

CROSS-REFERENCE TO RELATED APPLICATIONS

This application is a 371 of International Application No. PCT/KR2017/014799 filed on Dec. 15, 2017, which claims priority to Korean Patent Application No. 10-2017-0106751 filed on Aug. 23, 2017, the disclosures of which are herein incorporated by reference in their entirety.

FIELD

The disclosure generally relates to calibration, and more particularly to an apparatus and method for calibrating a phased array antenna.

DESCRIPTION OF RELATED ART

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'beyond 4G network' or a 'post long term evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

As described above, in order to perform communication in an ultra-high frequency band such as a millimeter wave band, beamforming of a transmission signal or a reception signal is required. For example, a phased array antenna may be used for beamforming. The phased array antenna includes a plurality of phase-adjustable antenna elements, and in the case where the phase of each antenna element is properly controlled, the phased array antenna may transmit a signal in a specific direction or form a beam in a specific direction. In order for the phased array antenna to focus a beam in a particular direction, the phases of electromagnetic waves emitted by each antenna element in a specific direction at an arbitrary time need to be equal to each other. To this end, calibration is required for a phased array antenna and/or individual antenna elements configuring the phased array antenna.

SUMMARY

Based on the discussion as described above, the disclosure provides an apparatus and method for calibrating a phased array antenna.

Further, the disclosure provides an apparatus and method for calibrating each radio frequency (RF) chain included in a phased array antenna.

Furthermore, the disclosure provides an apparatus and method for reducing a time required to calibrate each RF chain.

Still further, the disclosure provides an apparatus and method for calibrating a target RF chain, based on some phase values among all possible phase values of a target RF chain.

Still further, the disclosure provides an apparatus and method for calibrating a target RF chain based on a phase difference between signals transmitted from a reference RF chain and a target RF chain.

Still further, the disclosure provides an apparatus and method for calibrating a target RF chain, based on a phase state with respect to a phase difference of signals transmitted from a reference RF chain and a target RF chain.

According to various embodiments of the disclosure, a method for calibrating a phased array antenna may include: controlling a first radio frequency (RF) chain to transmit a first signal at a first phase, so as to determine a phase difference between the first phase and a reference phase; controlling the first RF chain to transmit a second signal at a second phase, so as to determine a phase state of the phase difference; and calibrating the first RF chain based on the phase difference and the phase state. The reference phase may be a phase of a reference signal transmitted from a reference RF chain.

According to various embodiments of the disclosure, an apparatus for calibrating a phased array antenna includes a controller configured to: control a first radio frequency (RF) chain to transmit a first signal at a first phase, so as to determine a phase difference between the first phase and a reference phase; control the first RF chain to transmit a second signal at a second phase, so as to determine a phase state of the phase difference; and calibrate the first RF chain based on the phase difference and the phase state. The reference phase may be a phase of a reference signal transmitted from a reference RF chain.

A device and method according to various embodiments of the disclosure may calibrate each RF chain by configuring a relatively small number of phase values in each radio frequency (RF) chain of a phased array antenna so as to reduce a time required for the calibration, and may contribute to mass production of the phased array antenna.

Effects which can be acquired by the disclosure are not limited to the above described effects, and other effects that have not been mentioned may be clearly understood by a person skilled in the art to which the disclosure belongs, from the following description.

DETAILED DESCRIPTION

The terms used in the disclosure are only used to describe specific embodiments, and are not intended to limit the disclosure. A singular expression may include a plural expression unless they are definitely different in context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal or similar to the contextual meanings in the relevant field of art, and are not to be interpreted to have ideal or excessively formal meanings unless clearly defined in the disclosure. In some cases, even the terms defined in the disclosure should not be interpreted to exclude embodiments of the disclosure.

Hereinafter, various embodiments of the disclosure describe an approach of hardware, as an example. However, various embodiments of the disclosure include a technology that uses both hardware and software and thus, the various embodiments of the disclosure may not exclude the perspective of software.

Hereinafter, the disclosure relates to an apparatus and method for calibrating a phased array antenna. Specifically, the disclosure describes a technology for performing faster calibration of a target RF chain by using a phase difference between a phase of a reference signal transmitted from a reference radio frequency (RF) chain and a phase of a signal transmitted from a target RF chain.

Terms used to describe signals used in the following description, terms referring to elements of an apparatus, and the like are illustrated for convenience of description. Accordingly, the disclosure is not limited to the following terms and other terms having the same technical meaning may be used.

Figure 1:
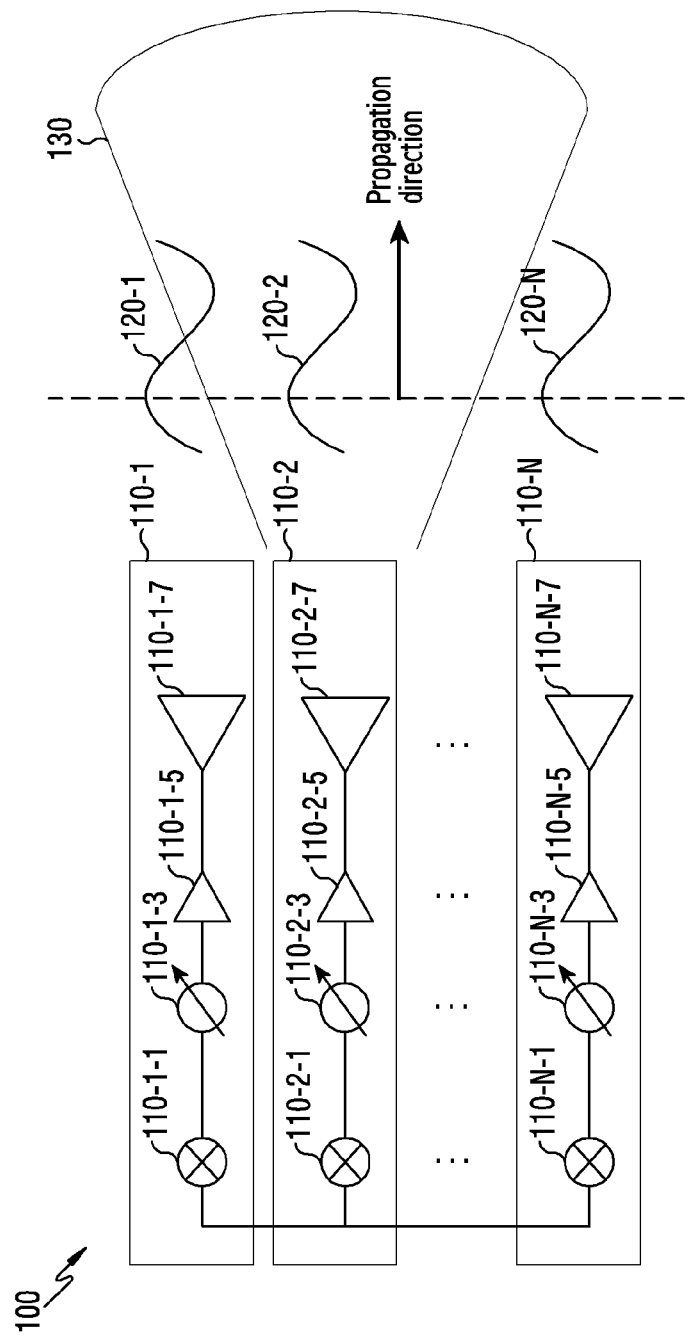
FIG. 1 illustrates a phased array antenna according to various embodiments of the disclosure.

FIG. 1 illustrates a phased array antenna 100 according to various embodiments of the disclosure. Referring to FIG. 1, the phased array antenna 100 includes a plurality of radio frequency (RF) chains 110-1 to 110-N. Hereinafter, for convenience of explanation, configurations of the RF chain 110-1 and functions of the respective configurations are described, but respective configurations of other RF chains (e.g., RF chains 110-2 to 110-N) may also perform a function similar to those of respective configurations of the RF chain 110-1.

A mixer 110-1-1 may convert a center frequency of an input signal and output a signal having the converted center frequency. For example, the mixer 110-1-1 may convert an intermediate frequency (IF) signal into an RF signal or convert the RF signal into an IF signal. Here, a frequency of the RF signal is represented as the sum of a frequency of the IF signal and a frequency of a local oscillator (LO) signal, whereas the frequency of the IF signal may be represented as a result obtained by subtracting the frequency of the LO signal from the frequency of the RF signal. To this end, the mixer 110-1-1 may be connected to the LO.

The phase shifter 110-1-3 may convert a phase of an input signal and output a signal having the converted phase. For example, the phase shifter 110-1-3 may lag or advance the phase of the input signal. One phase value among a plurality of phase values may be configured in the phase shifter 110-1-3. Each of the plurality of phase values may correspond to one of angles ranging from 0 degrees to 360 degrees, and different phase values may correspond to different angles. Therefore, if the phase shifter 110-1-3 receives an external control signal for changing the phase value currently configured in the phase shifter 110-1-3, the phase shifter 110-1-3 may change a phase of an input signal by a phase or an angle corresponding to the change in the phase value.

An amplifier 110-1-5 may amplify an input signal. The amplifier 110-1-5 may provide the amplified input signal to a radiator 110-1-7.

The radiator 110-1-7 may convert an input electrical signal into electromagnetic waves and radiate the electromagnetic waves into a free space.

A signal 120-1 is transmitted from the RF chain 110-1 through the mixer 110-1-1, the phase shifter 110-1-3, the amplifier 110-1-5, and the radiator 110-1-7, or the signal 120-1 is received by the RF chain 110-1 through the radiator 110-1-7, the amplifier 110-1-5, the phase shifter 110-1-3, and the mixer 110-1-1. Similarly, a signal 120-2 may be transmitted from an RF chain 110-2, or may be received by the RF chain 110-2, and a signal 120-N may be transmitted from the RF chain 110-N, or may be received by the RF chain 110-N.

If the initial phases of the signals 120-1 to 120-N, simultaneously transmitted from or received by the plurality of RF chains 110-1 to 110-N, are equal to each other, the signals 120-1 to 120-N as a whole may form a plane wave and propagate in a specific direction. The signals 120-1 to 120-N propagating in a specific direction may form a beam (e.g., beam 130) in a specific direction. If, in a state where the initial phases of the signals 120-1 to 120-N are equal to each other, phase values configured in the plurality of phase shifters 110-1-3 to 110-N-3, respectively, are changed to the same value, the signals 120-1 to 120-N as a whole may still form a plane wave, and may propagate in a direction changed by an angle corresponding to the change in the phase value in a specific direction. Accordingly, if a phase value is configured in each of the plurality of phase shifters 110-1-3 to 110-N-3 to make the initial phases of the signals 120-1 to 120-N be the same, an apparatus using the phased array antenna 100 may input the same phase value, which has been changed to correspond to a specific angle change, to the plurality of phase shifters 110-1-3 to 110-N-3 so as to form a beam in a desired direction or steer the beam. In other words, for beamforming and beam steering, a phase value needs to be configured in each of the plurality of phase shifters 110-1-3 to 110-N-3 such that the initial phases of the signals 120-1 to 120-N are to be equal to each other.

According to various embodiments of the disclosure, calibration refers to configuring phase values of the phase shifters 110-1-3 to 110-N-3 such that the initial phases of the signals 120-1 to 120-N are to be equal to each other. Calibration may be performed for each of the RF chains 110-1 to 110-N. For example, in the case where calibration is performed on the RF chain 110-1, a phase value for the phase shifter 110-1-3 included in the RF chain 110-1 may be configured such that the initial phase of the signal 120-1 is to be the same as the initial phase of a signal transmitted by the reference RF chain. Here, the reference RF chain refers to an RF chain that maintains the phase value of a phase shifter in order to perform calibration of at least one other RF chain. The reference RF chain may be one of the plurality of RF chains 110-1 to 110-N. For example, in the case where the reference RF chain is 110-1, calibration may be performed for the remaining RF chains 110-2 to 110-N. In this case, the remaining RF chains 110-2 to 110-N for which calibration is to be performed may be referred to as a "calibration target RF chain" or simply a "target RF chain".

If calibration has been performed for one RF chain, the RF chain may serve as a reference RF chain for calibration of another RF chain. In other words, the reference RF chain may be changed while calibrating the plurality of RF chains. For example, in the case where the RF chain 110-1 is used as a reference RF chain for calibration of the RF chain 110-2, the RF chain 110-2 may be used as the reference RF chain for calibration of the RF chain 110-3.

Calibration for each of the plurality of RF chains 110-1 to 110-N included in the phased array antenna 100 may be performed by a calibration apparatus. In other words, the calibration apparatus may calibrate each of the plurality of RF chains 110-1 to 110-N included in the phased array antenna 100. According to various embodiments of the disclosure, calibrating each of the plurality of RF chains 110-1 to 110-N included in the phased array antenna 100 may be understood as performing calibration of the phased array antenna 100. The phased array antenna for which calibration is to be performed may be referred to as "a target phased array antenna".

Figure 2:
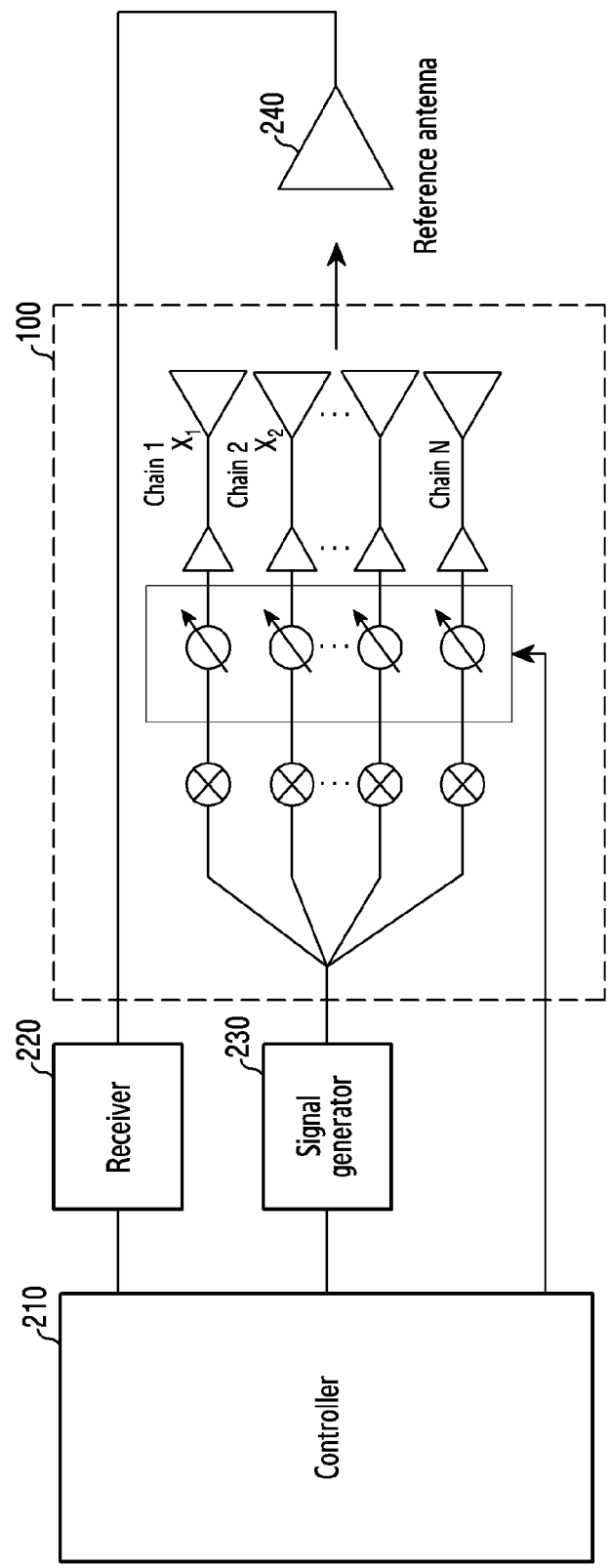
FIG. 2 illustrates a configuration of a calibration apparatus according to various embodiments of the disclosure.

The configuration of a calibration apparatus (e.g., calibration apparatus 200) for calibrating the phased array antenna 100 is described in more detail in FIG. 2.

FIG. 2 illustrates a configuration of a calibration apparatus 200 according to various embodiments of the disclosure. The term "~unit" or "~er" used hereinafter may refer to a unit for processing at least one function or operation, and may be implemented in hardware, software, or a combination of hardware and software. In addition, in FIG. 2, for convenience of explanation, it is assumed that the calibration apparatus 200 calibrates the phased array antenna 100, but this is exemplary and the calibration apparatus 200 may calibrate any phased array antenna.

Referring to FIG. 2, the calibration apparatus 200 includes a controller 210, a receiver 220, a signal generator 230, and a reference antenna 240.

The controller 210 controls overall operations of the calibration apparatus 200. For example, the controller 210 may control the signal generator 230 to generate a calibration signal. In addition, the controller 210 may control the receiver 220 to receive a signal through the reference antenna 240 and analyze the received signal. The controller 210 may include at least one processor or microprocessor or may be part of a processor to perform the above-described control operation.

According to various embodiments, the controller 210 may configure a phase value in each of the phase shifters 110-1-1 to 110-N-1, and may change the configured phase value. Configuration of the phase value in the phase shifters 110-1-1 to 110-N-1 may be understood as configuring phase values in the RF chains 110-1 to 110-N. For example, configuring a phase value in the phase shifter 110-1-1 may be understood as configuring a phase value in the RF chain 110-1 including the phase shifter 110-1-1. Thus, the phase value configured in each of the phase shifters 110-1-1 to 110-N-1 may be understood as phase values of the respective RF chains 110-1 to 110-N. The controller 210 may configure the phase values of the respective RF chains 110-1 to 110-N, and may control the respective RF chains 110-1 to 110-N to transmit a signal at an initial phase corresponding to the configured phase value.

According to various embodiments, the controller 210 may control on/off states of the respective RF chains 110-1 to 110-N. In other words, the controller 210 may turn on or off the respective RF chains 110-1 to 110-N. To this end, the controller 210 may block or maintain supply voltages of the respective RF chains 110-1 to 110-N. In addition, the controller 210 may transmit a control signal for controlling an on/off state to each of the RF chains 110-1 to 110-N.

According to various embodiments, the controller 210 may measure the power of a signal transmitted from the phased array antenna 100. In detail, the controller 210 may measure power of a signal transmitted from each RF chain in the phased array antenna 100, and measure power of a combined signal of signals transmitted from two or more RF chains.

The receiver 220 may receive a signal through the reference antenna 240. For example, the receiver 220 may receive a signal transmitted from a target phased array antenna (e.g., the phased array antenna 100) and analyze a spectrum of the received signal.

The signal generator 230 may generate a calibration signal for calibrating the phased array antenna 100. The signal generator 230 may provide the generated calibration signal to the phased array antenna 100 so as to enable signals to be transmitted from RF chains, which are in an on state, in the phased array antenna 100.

The calibration apparatus 200 may select a reference RF chain from among the RF chains 110-1 to 110-N, and may calibrate a target RF chain using the reference RF chain. For example, the calibration apparatus 200 may determine, while changing the phase value of the target RF chain, a phase value of a target RF chain, in which power for a combined signal of a signal (hereinafter referred to as a reference signal) transmitted from a reference RF chain and a signal (hereinafter, a test signal) transmitted from the target RF chain is maximized. In the case where the initial phase of the reference signal and the initial phase of the signal transmitted from the target RF chain are equal to each other, the power for the combined signal may be maximized, and thus the calibration apparatus 200 may determine the phase value of the target RF chain, in which the power for the combined signal is maximized, to be an optimal phase value. The calibration apparatus 200 may configure the optimal phase value in the target RF chain and calibrate the target RF chain.

According to various embodiments, the calibration apparatus 200 may calibrate the target RF chain by determining the power of a combined signal with respect to all possible phase values of the target RF chain. However, if the number of all possible phase values of the target RF chain is large, determining the power of the combined signal with respect to all possible phase values of the target RF chain may require relatively long periods of time. For example, if the phase value is represented by m-bits, the number of possible phase values is $2^m$, so that the calibration apparatus 200 needs to determine power of a combined signal for up to $2^m$ phase values for each RF chain in order to calibrate the phased array antenna. If the periods of time required to calibrate a phased array antenna (hereinafter referred to as a calibration time) is relatively long, a long calibration time may adversely affect mass production of the phased array antenna.

Accordingly, various embodiments of the disclosure propose an apparatus and method for reducing a time required to calibrate a phased array antenna and enabling mass production of the phased array antenna, and will be described in more detail below.

Figure 3:
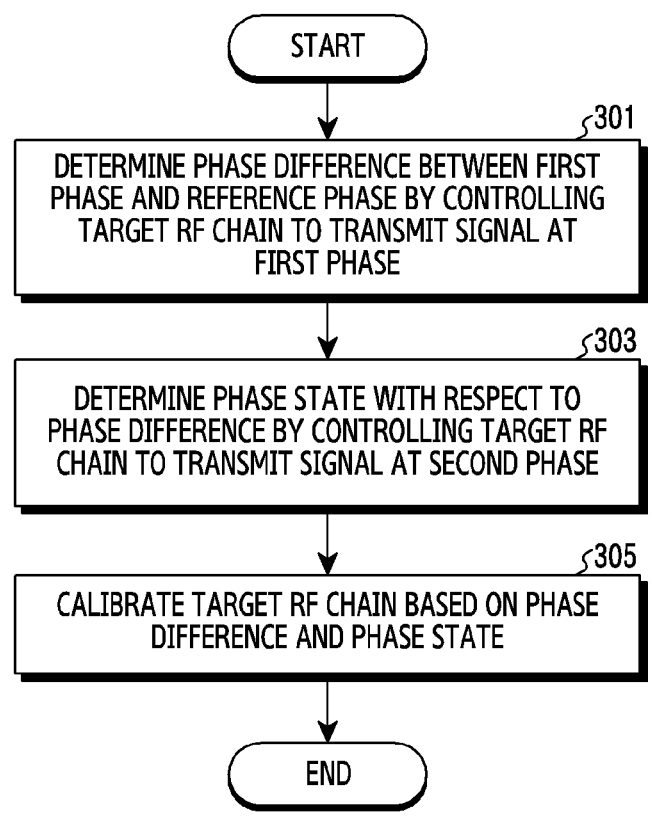
FIG. 3 is a flowchart illustrating an operation of a calibration apparatus according to various embodiments of the disclosure.

FIG. 3 is a flowchart illustrating an operation of a calibration apparatus according to various embodiments of the disclosure. FIG. 3 illustrates an operation method of a calibration apparatus 200.

Referring to FIG. 3, in operation 301, the calibration apparatus controls a target RF chain to transmit a first signal at a first phase, so as to determine a phase difference between the first phase and the reference phase. The first phase may be an initial phase corresponding to an arbitrary phase value configured in the target RF chain. The reference phase is an initial phase of a reference signal transmitted from a reference RF chain and may be an initial phase corresponding to an arbitrary phase value configured in the reference RF chain. The calibration apparatus may provide a calibration signal to the reference RF chain and the target RF chain so as to enable the target RF chain to transmit the first signal and to enable the reference RF chain to transmit the reference signal. The calibration apparatus may determine a phase difference between the first phase and the reference phase by using at least one of the first signal and the reference signal. Here, the phase difference between the first phase and the reference phase denotes an absolute value of a result obtained by subtracting the reference phase from the first phase (or, a result obtained by subtracting the first phase from the reference phase).

In operation 303, the calibration apparatus controls the target RF chain to transmit a second signal at a second phase to determine a phase state of the phase difference between the first phase and the reference phase. The calibration apparatus may change a phase value configured in the target RF chain, so as to change the initial phase of a signal transmitted by the target RF chain from the first phase to the second phase. Here, the change in the phase value configured in the target RF chain may correspond to a difference between the first phase and the second phase. The calibration apparatus may determine the phase state of the phase difference between the first phase and the reference phase, using at least one of the second signal and the reference signal.

According to various embodiments of the disclosure, the phase state of the phase difference indicates the phase that precedes (leads) and the phase that follows (lagged), among two phases having a defined phase difference therebetween. For example, the phase state of the phase difference between the first phase and the reference phase may be one of a state in which the first phase precedes the reference phase and a state in which the first phase is delayed than the reference phase.

In operation 305, the calibration apparatus calibrates the target RF chain based on the phase difference and the phase state. In other words, the calibration apparatus configures a phase value of the target RF chain, based on the phase difference and the phase state, such that the reference phase and the initial phase of a signal transmitted by the target RF chain are equal to each other. For example, if the phase state indicates that the reference phase precedes the first phase, the calibration apparatus may change the phase value configured in the target RF chain such that the initial phase of the signal transmitted by the target RF chain increases, from the first phase, by a phase difference. As another example, if the phase state indicates that the reference phase is delayed than the first phase, the calibration apparatus may change the phase value configured in the target RF chain such that the initial phase of the signal transmitted by the target RF chain decreases, from the first phase, by the phase difference.

The calibration apparatus as shown in FIG. 3 configures two phase values (a phase value corresponding to the first phase and a phase value corresponding to the second phase) in the target RF chain in order to calibrate the target RF chain. In other words, according to various embodiments of the disclosure, since the calibration apparatus does not consider all possible phase values of the target RF chain in order to calibrate the target RF chain, it is possible to reduce the calibration time for a phased array antenna and enable mass production of the phased array antenna.

Figure 4:
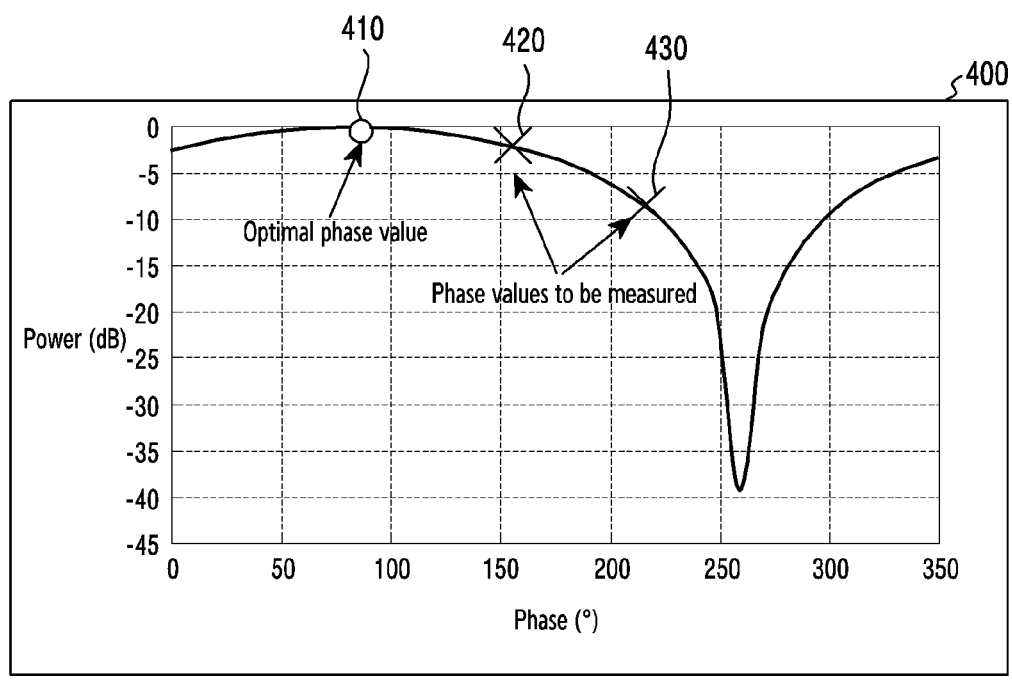
FIG. 4 is a graph illustrating phase values, which are considered to determine an optimal phase value, according to various embodiments of the disclosure.

FIG. 4 illustrates a graph 400 illustrating phase values, which are considered to determine an optimal phase value, according to various embodiments of the disclosure. In the graph 400, the horizontal axis represents a phase value in units of degrees, configured in a target RF chain, and the vertical axis represents power (decibel, dB units) for a combined signal of a reference signal transmitted by a reference RF chain and a test signal transmitted by a target RF chain.

According to the graph 400, in the case where a phase value 410 is configured in the target RF chain, the power of the combined signal may be maximized. In other words, in the case where a phase value 410 is configured in the target RF chain, since the reference phase and the initial phase of the test signal are equal to each other, the calibration apparatus needs to perform calibration of the target RF chain such that the phase value of the target RF chain is configured as the phase value 410.

According to various embodiments of the disclosure, the calibration apparatus may determine the phase value 410 by considering power of a combined signal of a phase value 420 and a phase value 430 (i.e., two phase values) without considering power of a combined signal for all phase values (0° to 360°). For example, the calibration apparatus may configure the phase value 420 in the target RF chain and control the target RF chain to transmit a signal at an initial phase corresponding to the phase value 420, so as to determine a phase difference of the reference phase and the initial phase corresponding to the phase value 420. In addition, the calibration apparatus may configure a phase value 430 in the target RF chain and control the target RF chain to transmit a signal at an initial phase corresponding to the phase value 430, so as to determine a phase state with respect to the phase difference between the reference phase and the initial phase corresponding to the phase value 420. However, this is exemplary and arbitrary phase values in the graph 400 may be used to determine the phase difference and the phase state.

A detailed algorithm for determining the phase difference between the reference phase and the initial phase of the test signal is described below.

The reference signal transmitted from the reference RF chain and the test signal transmitted from the target RF chain may be represented by [Equation 1] below.

$$x_1 = A_1 e^{j\theta_1}$$

$$x_2 = A_2 e^{j\theta_2} \quad \text{[Equation 1]}$$

Here, $x_1$ denotes a reference signal, $A_1$ denotes an amplitude of the reference signal, $\theta_1$ denotes a phase of the reference signal at an arbitrary time, $x_2$ denotes a test signal, $A_2$ denotes an amplitude of the test signal, and $\theta_2$ denotes a phase of the test signal at an arbitrary time.

$\theta_1$ and $\theta_2$ may be represented by [Equation 2] below.

$$\theta_1 = 2\pi f t + \Psi_1$$

$$\theta_2 = 2\pi f t + \Psi_2 \quad \text{[Equation 2]}$$

Here, $\theta_1$ denotes a phase of a reference signal at an arbitrary time, $\theta_2$ denotes a phase of a test signal at an arbitrary time, f denotes the frequency of the reference signal and the test signal, $\Psi_1$ denotes a reference phase, and $\Psi_2$ denotes an initial phase of the test signal.

Power of a combined signal of the reference signal and the test signal may be represented by [Equation 3] below.

$$|y|^2 = |A_1 e^{j\theta_1} + A_2 e^{j\theta_2}|^2 \quad \text{[Equation 3]}$$

Here, y denotes a combined signal of the reference signal and the test signal, $A_1$ denotes an amplitude of the reference signal, $\theta_1$ denotes a phase of the reference signal at an arbitrary time, $A_2$ denotes an amplitude of the test signal, and $\theta_2$ denotes a phase of the test signal at an arbitrary time. Thus, $|y|^2$ may be understood as the power of the combined signal.

If [Equation 3] is developed, the power of the combined signal may be represented by [Equation 4] below.

$$|y|^2 = (A_1 \cos\theta_1 + A_2 \cos\theta_2)^2 + (A_1 \sin\theta_1 + A_2 \sin\theta_2)^2 \quad \text{[Equation 4]}$$

Here, y denotes a combined signal of the reference signal and the test signal, $A_1$ denotes an amplitude of the reference signal, $\theta_1$ denotes a phase of the reference signal at an arbitrary time, $A_2$ denotes an amplitude of the test signal, and $\theta_2$ denotes a phase of the test signal at an arbitrary time.

According to the cosine law, [Equation 4] may be modified as in [Equation 5] below.

$$\cos(\theta_1 - \theta_2) = \frac{|y|^2 - A_1^2 - A_2^2}{2A_1 A_2} \quad \text{[Equation 5]}$$

Here, y denotes a combined signal of the reference signal and the test signal, $A_1$ denotes an amplitude of the reference signal, $\theta_1$ denotes a phase of the reference signal at an arbitrary time, $A_2$ denotes an amplitude of the test signal, and $\theta_2$ denotes a phase of the test signal at an arbitrary time. $A_1^2$ and $A_2^2$ may be understood as power of the reference signal and power of the test signal, respectively.

In [Equation 5], $\theta_1 - \theta_2$ may be represented by [Equation 6] below.

$$\theta_1 - \theta_2 = (2\pi f t + \Psi_1) - (2\pi f t + \Psi_2) = \Psi_1 - \Psi_2 \quad \text{[Equation 6]}$$

Here, $\theta_1$ denotes a phase of the reference signal at an arbitrary time, $\theta_2$ denotes a phase of the test signal at an arbitrary time, f denotes the frequency of the reference signal and the test signal, $\Psi_1$ denotes a reference phase, and $\Psi_2$ denotes an initial phase of the test signal.

According to <Equation 6>, the result obtained by subtracting the phase $\theta_2$ of the test signal from the phase $\theta_1$ of the reference signal at an arbitrary time is the same as the result obtained by subtracting the initial phase $\Psi_2$ of the test signal from the reference phase $\Psi_1$. Therefore, according to [Equation 6], [Equation 5] may be represented by [Equation 7] below.

$$\alpha = |\Psi_1 - \Psi_2| = \arccos\left[\frac{|y|^2 - A_1^2 - A_2^2}{2A_1 A_2}\right] \quad \text{[Equation 7]}$$

Here, $\alpha$ denotes a phase difference between the reference phase and the initial phase of the test signal, $\Psi_1$ denotes a reference phase, $\Psi_2$ denotes an initial phase of the test signal, where y denotes a combined signal of the reference signal and the test signal, $A_1$ denotes an amplitude of the reference signal, and $A_2$ denotes an amplitude of the test signal.

In [Equation 7], since the amplitude $A_1$ of the reference signal and the amplitude $A_2$ of the test signal may be determined inversely from the power $A_1^2$ of the reference signal and the power $A_2^2$ of the test signal, the phase difference between the reference phase and the initial phase of the test signal may be determined based on the power $|y|^2$ of the combined signal, the power $A_1^2$ of the reference signal and the power $A_2^2$ of the test signal.

Hereinafter, an operation of calibrating the target RF chain using the phase difference will be described in more detail with reference to FIG. 5.

Figure 5:
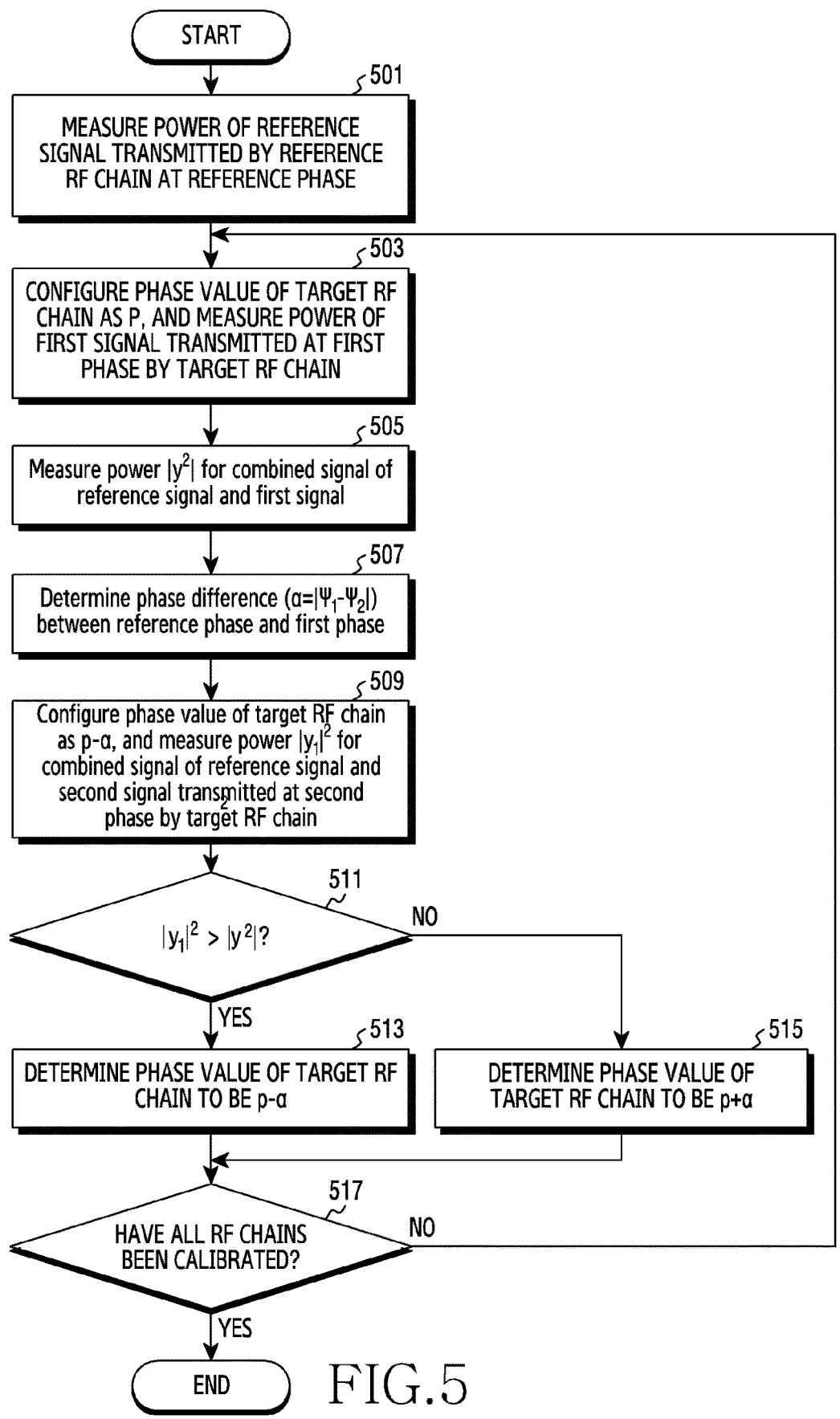
FIG. 5 is a flowchart illustrating an operation of a calibration apparatus for performing calibration by comparing power of combined signals according to various embodiments of the disclosure.

FIG. 5 is a flowchart illustrating an operation of a calibration apparatus for performing calibration by comparing the power of combined signals according to various embodiments of the disclosure. FIG. 5 exemplifies an operation method of the calibration apparatus 200.

Referring to FIG. 5, in operation 501, the calibration apparatus measures power of a reference signal transmitted at a reference phase in a reference RF chain. The reference phase may be an initial phase corresponding to an arbitrary phase value configured in the reference RF chain. In order to measure the power of the reference signal, the calibration apparatus may turn on only the reference RF chain and turn off the remaining RF chains, in the phased array antenna (e.g., the phased array antenna 100). The calibration apparatus may provide a calibration signal to the reference RF chain to perform control such that the reference RF chain transmits the reference signal, and may receive the reference signal through a reference antenna (for example, the reference antenna 240) to measure the power of the reference signal.

In operation 503, the calibration apparatus configures, as p, a phase value of the target RF chain, and thus measures power of a first signal transmitted at the first phase in the target RF chain. Here, p may be an arbitrary phase value and the first phase may be an initial phase corresponding to p.

The calibration apparatus may turn on only the target RF chain and turn off the remaining RF chains in the phased array antenna in order to measure the power of the first signal. The calibration apparatus may provide a calibration signal to the target RF chain to perform control such that the target RF chain transmits the first signal, and may receive the first signal through the reference antenna to measure the power of the first signal.

In operation 505, the calibration apparatus measures power $|y|^2$ of a combined signal y of the reference signal and the first signal. The calibration apparatus may turn on only the target RF chain and the reference RF chain and turn off the remaining RF chains, in the phased array antenna, in order to measure power $|y|^2$ of the combined signal y. In this case, since the target RF chain is already turned on in operation 503, the calibration apparatus may additionally turn on only the reference RF chain in operation 505. The calibration apparatus may configure a phase value corresponding to the reference phase in the reference RF chain, as in operation 501. The calibration apparatus may provide a calibration signal to the reference RF chain and the target RF chain to perform control such that the reference RF chain transmits the reference signal and the target RF chain transmits the first signal. The calibration apparatus may receive the combined signal y of the reference signal and the first signal through the reference antenna, and thus measure the power $|y|^2$ of the combined signal y.

In operation 507, the calibration apparatus determines a phase difference $\alpha=|\Psi_1-\Psi_2|$ between the reference phase and the first phase. Here, $\Psi_1$ may be a reference phase, and $\Psi_2$ may be a first phase. For example, the calibration apparatus may determine a phase difference $\alpha$ based on power of the reference signal, power of the first signal, and power $|y|^2$ of the combined signal y, as shown in <Equation 7>.

In operation 509, the calibration apparatus configures the phase value of the target RF chain as p−α, and thus measures power $|y_1|^2$ of the combined signal $y_1$ of the reference signal and the second signal transmitted at the second phase in the target RF chain. Here, the phase value of p−α may denote a phase value, which is obtained in the case where the phase value p is changed by a phase value corresponding to "−α", and the second phase may be an initial phase corresponding to p−α. In other words, the second phase may be the result obtained by subtracting the phase difference from the first phase. The calibration apparatus may provide a calibration signal to the reference RF chain and the target RF chain to perform control such that the reference RF chain transmits the reference signal and the target RF chain transmits the second signal. The calibration apparatus may receive the combined signal $y_1$ of the reference signal and the second signal through the reference antenna, and thus measure power $|y_1|^2$ of the combined signal $y_1$.

In operation 511, the calibration apparatus determines whether the power $|y_1|^2$ of the combined signal $y_1$ is greater than the power $|y|^2$ of the combined signal y.

If the power $|_1|^2$ of the combined signal $y_1$ is greater than the power $|y|^2$ of the combined signal y, in operation 513, the calibration apparatus determines the phase value of the target RF chain to be p−α. In other words, the calibration apparatus may maintain the phase value configured in the target RF chain in operation 509. Since the power $|y_1|^2$ of the combined signal $y_1$ in the case where the phase value p−α is configured in the target RF chain, is greater than the power $|y|^2$ of the combined signal y in the case where the phase value p is configured in the target chain, the calibration apparatus may determine the phase state for the phase difference such that the reference phase is delayed than the first phase by a phase difference α, and may determine the phase value of the target RF chain to be p−α. In other words, since the initial phase of a signal transmitted from the target RF chain, in which the phase value p−α is configured, is the same as the reference phase, the calibration apparatus may configure the phase value of the target RF chain to p−α, and thus complete calibration of the target RF chain.

If the power $|y_1|^2$ of the combined signal $y_1$ is smaller than the power $|y|^2$ of the combined signal y, in operation 515, the calibration apparatus determines the phase value of the target RF chain to be p+α. Since the power $|y_1|^2$ of the combined signal $y_1$ in the case where the phase value p−α is configured in the target RF chain is smaller than the power $|y|^2$ of the combined signal y in the case where the phase value p is configured in the target chain, the calibration apparatus may determine the phase state of the phase difference such that the reference phase precedes the first phase by a phase difference α, and may determine the phase value of the target RF chain to be p+α. In other words, since the initial phase of a signal transmitted from the target RF chain, in which the phase value p+α is configured, is the same as the reference phase, the calibration apparatus may configure the phase value of the target RF chain as p+α, and thus complete calibration of the target RF chain.

In operation 517, the calibration apparatus determines whether all RF chains have been calibrated. In other words, the calibration apparatus determines whether all RF chains included in the phased array antenna have been calibrated. If all RF chains have been calibrated, the calibration apparatus terminates this algorithm. If all RF chains are not calibrated, the calibration apparatus changes the target RF chain and repeats operations 503 to 515.

In operation 509, the phase value of the target RF chain is configured as p−α, but this is exemplary, and the phase value of the target RF chain may be configured as p+α. In this case, in operation 513, the calibration apparatus may determine a phase value of the target RF chain as p+α, and in operation 515, the calibration apparatus may determine the phase value of the target RF chain as p+α.

Hereinafter, a relationship between a phase state of a phase difference and a change in a phase value for the target RF chain will be described in more detail in FIG. 6.

Figure 6:
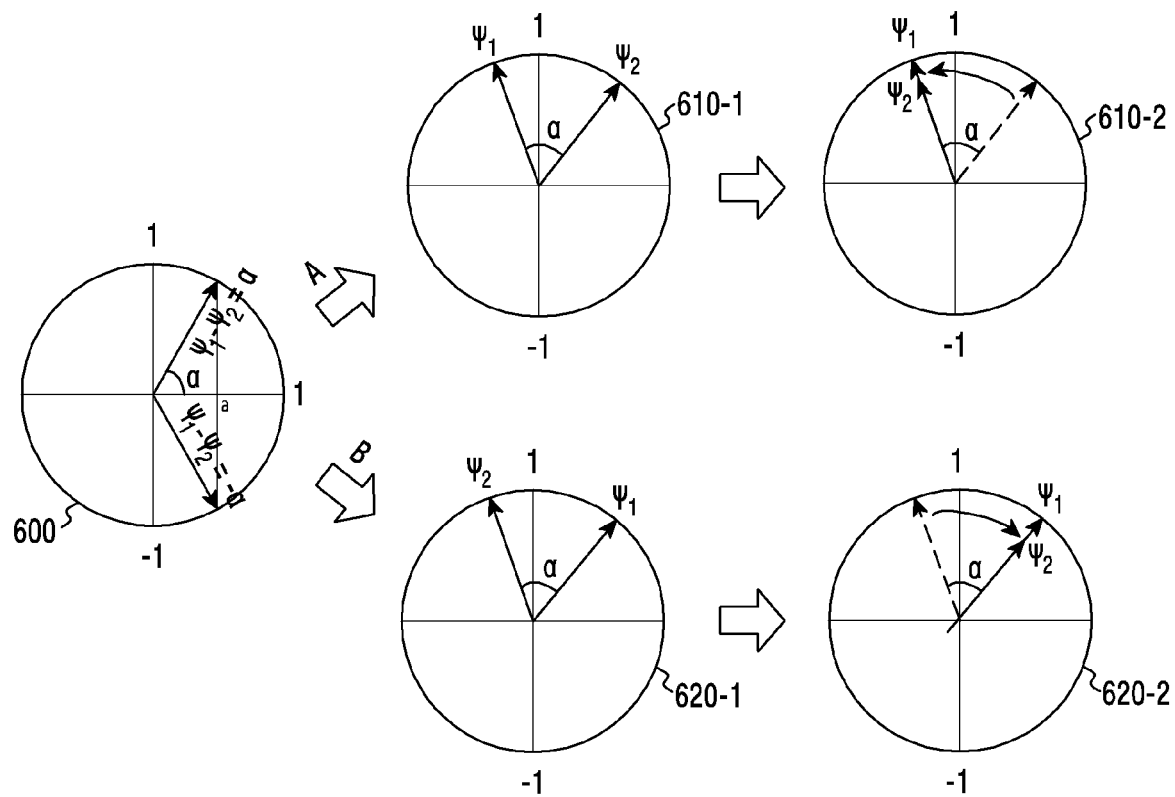
FIG. 6 illustrates a phase diagram illustrating a relationship between a phase state and a change in a phase value according to various embodiments of the disclosure.

FIG. 6 illustrates phase diagrams illustrating a relationship between a phase state and a change in a phase value according to various embodiments of the disclosure.

In the case where a phase difference α between a reference phase $\Psi_1$ and an initial phase $\Psi_2$ of a test signal is defined as $\alpha=|\Psi_1-\Psi_2|$, the result $\Psi_1-\Psi_2$ obtained by subtracting the initial phase $\Psi_2$ of the test signal from the reference phase $\Psi_1$ may be α or −α according to a phase state of the phase difference, as shown in the phase diagram 600.

As shown in a phase diagram 610-1, in the case where the phase state of the phase difference is in a state where the reference phase $\Psi_1$ precedes the initial phase $\Psi_2$ of the test signal, the result $\Psi_1-\Psi_2$ obtained by subtracting the initial phase $\Psi_2$ of the test signal from the reference phase $\Psi_1$ may be α. In this case, the calibration apparatus may change the phase value of the target RF chain by a phase value corresponding to "+α" so that the initial phase $\Psi_2$ of the test signal is the same as the reference phase $\Psi_1$, as shown in the phase diagram 610-2.

On the other hand, as shown in the phase diagram 620-1, in the case where the phase state of the phase difference is in a state where the reference phase $\Psi_1$ is lagged than the initial phase $\Psi_2$ of the test signal, the result $\Psi_1-\Psi_2$ obtained by subtracting the initial phase $\Psi_2$ of the test signal from the reference phase $\Psi_1$ may be "$-\alpha$". In this case, the calibration apparatus may change the phase value of the target RF chain by a phase value corresponding to "$-\alpha$" so that the initial phase $\Psi_2$ of the test signal is the same as the reference phase $\Psi_1$, as shown in the phase diagram 620-2.

Figure 7:
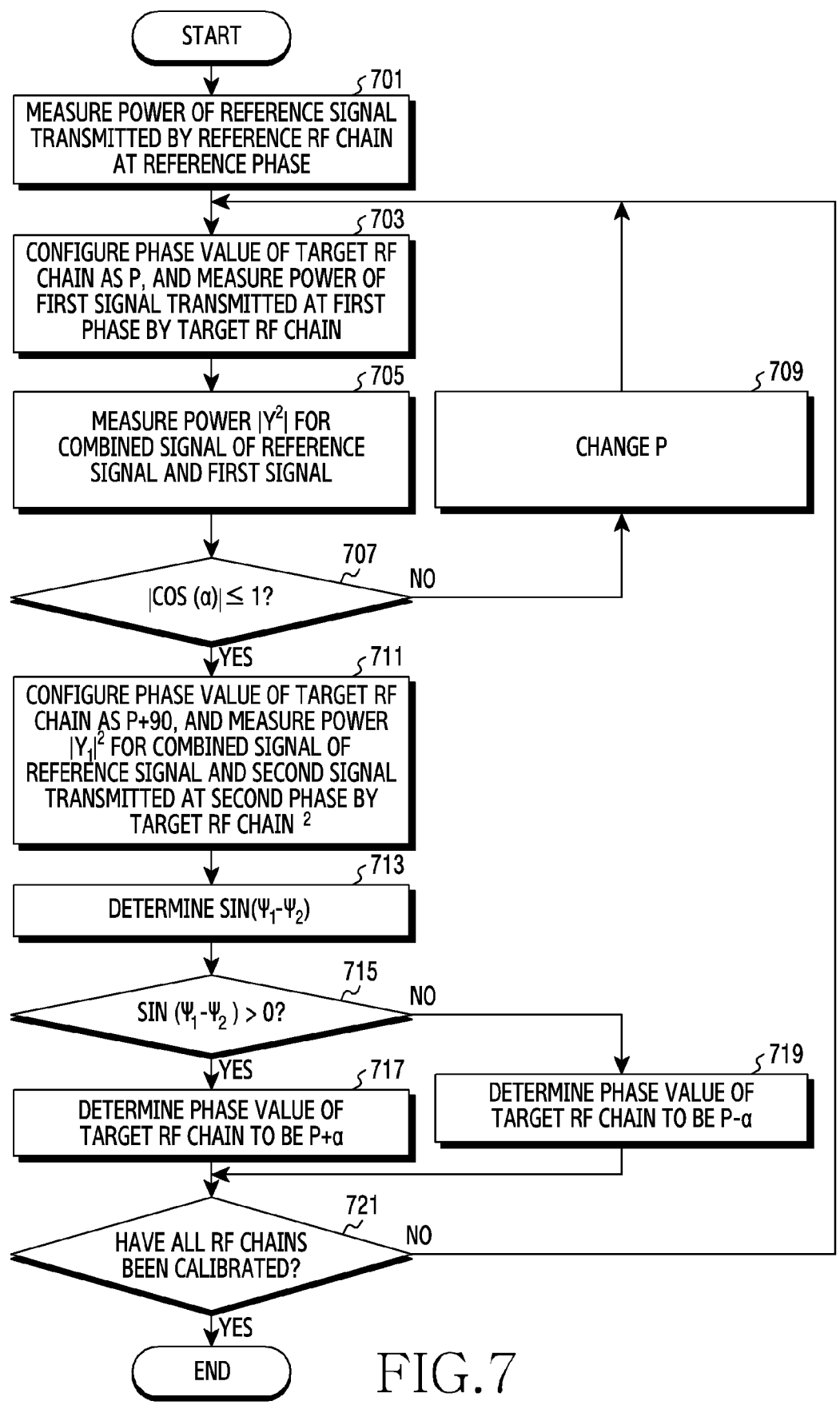
FIG. 7 is a flowchart illustrating an operation of a calibration apparatus for performing calibration by determining a phase state of a phase difference according to various embodiments of the disclosure.

In FIG. 7, an operation of determining a phase state of a phase difference and performing calibration by a calibration apparatus will be described in more detail.

FIG. 7 is a flowchart illustrating an operation of a calibration apparatus for performing calibration by determining a phase state of a phase difference according to various embodiments of the disclosure. FIG. 7 illustrates an operation of the calibration apparatus 200. In FIG. 7, operations 701, 703, and 705 are the same as operations 501, 503, and 505 of FIG. 5.

In operation 707, the calibration apparatus determines whether an absolute value of a cosine value cos ($\alpha$) for a phase difference $\alpha$ between a reference phase and a first phase is smaller than or equal to 1. Here, the phase difference $\alpha$ may be defined by $\alpha|\Psi_1-\Psi_2|$, $\Psi_1$ may be a reference phase, and $\Psi_2$ may be a first phase. For example, the calibration apparatus may determine cos ($\alpha$), based on power of the reference signal, power of the first signal, and power $|y|^2$ of a combined signal y, as shown in <Equations 5 and 6>. Since the range of the absolute value of the cosine function may not exceed 1, in operation 707, determining of whether the absolute value of cos ($\alpha$) is smaller than or equal to 1 may be understood as verifying the validity of the cos ($\alpha$).

If the absolute value of cos ($\alpha$) is greater than 1, in operation 709, the calibration apparatus may change the phase value p, configured in the target RF chain, to another value, and proceeds to operation 703 and subsequent operations. According to various embodiments of the disclosure, operations 707 and 709 may be omitted.

If the absolute value of cos ($\alpha$) is smaller than 1, in operation 711, the calibration apparatus configures the phase value of the target RF chain as p+90, and measures the power $|y_1|^2$ of the combined signal $y_1$ of the reference signal and a second signal transmitted at a second phase in the target RF chain. Here, the phase value of p+90 may denote a phase value, which is obtained in the case where the phase value p is changed by a phase value corresponding to "+90°", and the second phase may be an initial phase corresponding to p+90. In other words, the second phase may be the result obtained by adding 90° to the first phase (i.e., $\Psi_2$+90°). The calibration apparatus may receive a combined signal $y_1$ of the reference signal and the second signal through the reference antenna and measure power $|y_1|^2$ of the combined signal $y_1$.

In operation 713, the calibration apparatus determines a sine value sin ($\Psi_1-\Psi_2$) for the result obtained by subtracting the first phase $\Psi_2$ from the reference phase $\Psi_1$. Here, the sine value sin ($\Psi_1-\Psi_2$) for the result obtained by subtracting the first phase $\Psi_2$ from the reference phase $\Psi_1$ is the same as the cosine value for the result obtained by subtracting the second phase from the reference phase $\Psi_1$. That is, since the second phase is $\Psi_2$+90°, the cosine value cos ($\Psi_1-(\Psi_2+90°)$) for the result obtained by subtracting the second phase from the reference phase $\Psi_1$ may be represented by cos ($\Psi_1-\Psi_2-90°$), and is the same as sin ($\Psi_1-\Psi_2$). Therefore, instead of determining the sine value sin ($\Psi_1-\Psi_2$) of the result obtained by subtracting the first phase $\Psi_2$ from the reference phase $\Psi_1$, the calibration apparatus may determine the cosine value for the result obtained by subtracting the second phase from the reference phase $\Psi_1$. For example, the calibration apparatus may determine a cosine value relating to a result obtained by subtracting a second phase from the reference phase $\Psi_1$, based on power of the reference signal, power of the second signal, and power $|y_1|^2$ of the combined signal $y_1$, as shown in <Equations 5 and 6>. Here, since the second signal and the first signal differ only in the initial phase thereof, the power of the second signal is the same as the power of the first signal.

In operation 715, the calibration apparatus determines whether the sine value sin ($\Psi_1-\Psi_2$) for the result obtained by subtracting the first phase $\Psi_2$ from the reference phase $\Psi_1$ is greater than zero.

If the sine value sin ($\Psi_1-\Psi_2$) for the result obtained by subtracting the first phase $\Psi_2$ from the reference phase $\Psi_1$ is greater than zero, in operation 717, the calibration apparatus determines the phase value of the target RF chain to be p+$\alpha$. The case where the sine value sin ($\Psi_1-\Psi_2$) for the result obtained by subtracting the first phase $\Psi_2$ from the reference phase $\Psi_1$ is greater than zero may mean that the result obtained by subtracting the first phase $\Psi_2$ from the reference phase $\Psi_1$ is greater than zero, so that the calibration apparatus may determine the phase state of the phase difference to be a state in which the reference phase precedes the first phase by a phase difference $\alpha$. Therefore, the calibration apparatus may configure the phase value of the target RF chain as p+$\alpha$, and thus complete the calibration of the target RF chain.

If the sine value sin ($\Psi_1-\Psi_2$) for the result obtained by subtracting the first phase $\Psi_2$ from the reference phase $\Psi_1$ is smaller than zero, in operation 719, the calibration apparatus determines the phase value of the target RF chain to be p−$\alpha$. The case where the sine value sin ($\Psi_1-\Psi_2$) for the result obtained by subtracting the first phase $\Psi_2$ from the reference phase $\Psi_1$ is greater than zero may mean that the result obtained by subtracting the first phase $\Psi_2$ from the reference phase $\Psi_1$ is greater than zero, so that the calibration apparatus may determine the phase state of the phase difference to be a state in which the reference phase is delayed than the first phase by a phase difference $\alpha$. Therefore, the calibration apparatus may configure the phase value of the target RF chain as p−$\alpha$, and thus complete the calibration of the target RF chain.

In operation 721, the calibration apparatus determines whether all RF chains have been calibrated. In other words, the calibration apparatus determines whether all RF chains included in the phased array antenna have been calibrated. If all RF chains have been calibrated, the calibration apparatus terminates this algorithm. If all RF chains are not calibrated, the calibration apparatus changes the target RF chain and repeats operations 703 to 719.

Hereinafter, referring to FIG. 8, a method for determining a phase state according to various embodiments of the disclosure is described.

Figure 8:
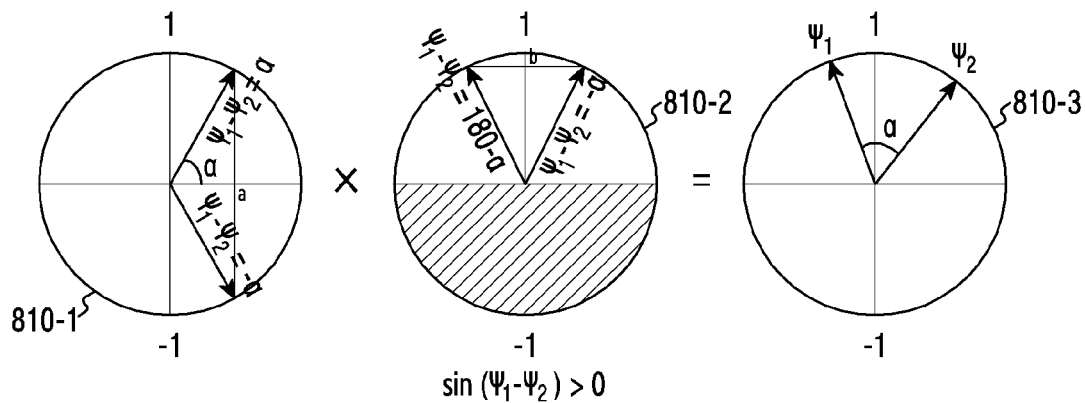
FIG. 8 is a phase diagram illustrating a method for determining a phase state according to various embodiments of the disclosure.
Figure 8:
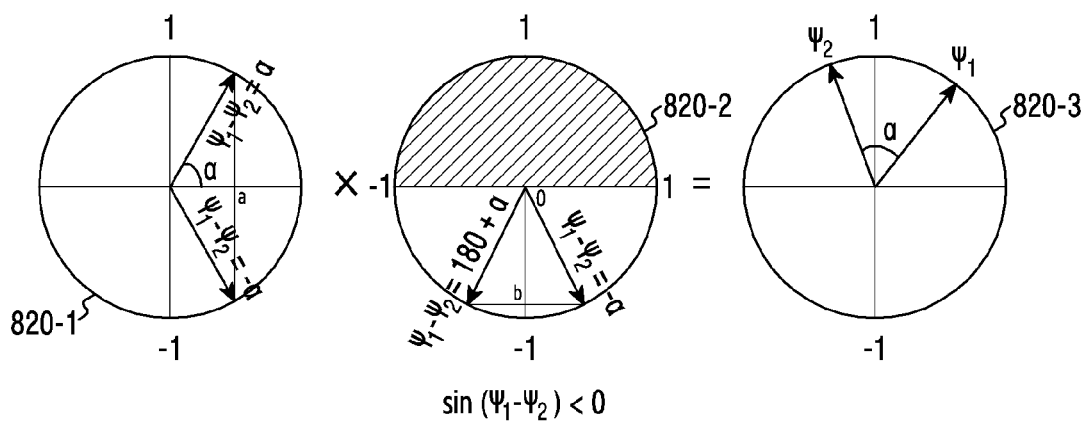

FIG. 8 is a phase diagram illustrating a method for determining a phase state according to various embodiments of the disclosure.

If a phase difference $\alpha$ between a reference phase $\Psi_1$ and an initial phase $\Psi_2$ of a test signal is defined by $\alpha=|\Psi_1-\Psi_2|$, the result $\Psi_1-\Psi_2$ obtained by subtracting the initial phase $\Psi_2$ of the test signal from the reference phase $\Psi_1$ may be $\alpha$ or −$\alpha$ according to the phase state for the phase difference, as shown in phase diagrams 810-1 and 820-1.

If the sine value sin ($\Psi_1-\Psi_2$) for the result obtained by subtracting the initial phase $\Psi_2$ of the test signal from the reference phase $\Psi_1$ is greater than zero, the result obtained by subtracting the initial phase $\Psi_2$ of the test signal from the reference phase $\Psi_1$ may be greater than zero, as shown in the phase diagram 810-2. Therefore, the result $\Psi_1-\Psi_2$ obtained by subtracting the initial phase $\Psi_2$ of the test signal from the reference phase $\Psi_1$ may be $\alpha$, which means that the reference phase $\Psi_1$ leads by $\alpha$ than the initial phase $\Psi_2$ of the test signal, as shown in a phase diagram 810-3. In this case, the calibration apparatus may change the phase value of the target RF chain by a phase value corresponding to "+$\alpha$" so that the initial phase $\Psi_2$ of the test signal is the same as the reference phase $\Psi_1$.

If the sine value sin ($\Psi_1-\Psi_2$) for the result obtained by subtracting the initial phase $\Psi_2$ of the test signal from the reference phase $\Psi_1$ is smaller than zero, the result obtained by subtracting the initial phase $\Psi_2$ of the test signal from the reference phase $\Psi_1$ may be smaller than zero, as shown in the phase diagram 820-2. Therefore, the result $\Psi_1-\Psi_2$ obtained by subtracting the initial phase $\Psi_2$ of the test signal from the reference phase $\Psi_1$ may be "$-\alpha$", which means that the reference phase $\Psi_1$ is lagged by $\alpha$ than the initial phase $\Psi_2$ of the test signal as shown in the phase diagram 820-3. In this case, the calibration apparatus may change the phase value of the target RF chain by a phase value corresponding to "$-\alpha$" so that the initial phase $\Psi_2$ of the test signal is the same as the reference phase $\Psi_1$.

Figure 9:
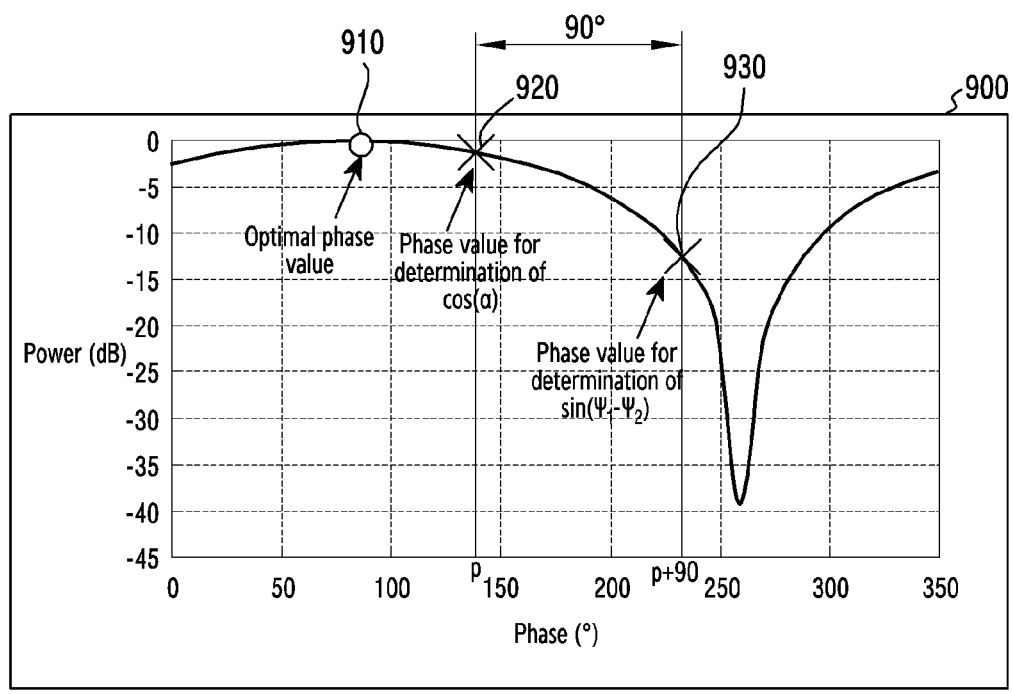
FIG. 9 is a graph illustrating phase values, which are considered to determine an optimal phase value based on a phase state, according to various embodiments of the disclosure.

In FIG. 9, phase values considered to determine an optimal phase value based on a phase state are described using a graph.

FIG. 9 illustrates a graph 900 showing phase values, which are considered to determine an optimal phase value based on a phase state, according to various embodiments of the disclosure. In the graph 900, the horizontal axis represents a phase value in units of degrees, configured in a target RF chain, and the vertical axis represents power (dB units) for a combined signal of a reference signal transmitted by a reference RF chain and a test signal transmitted by a target RF chain.

According to the graph 900, in the case where the phase value 910 is configured in the target RF chain, the power of the combined signal may be maximized. In other words, in the case where a phase value 910 is configured in the target RF chain, since the reference phase is the same as the initial phase of the test signal, the calibration apparatus needs to perform calibration of the target RF chain such that the phase value of the target RF chain is configured as the phase value 910.

According to various embodiments of the disclosure, the calibration apparatus may configure a phase value 920 in the target RF chain in order to determine a phase difference between the reference phase and the first phase. Here, the first phase is an initial phase of the test signal and may correspond to a phase value 920. For example, the calibration apparatus may determine the phase difference between the reference phase and the first phase by using <Equation 7>.

According to various embodiments of the disclosure, the calibration apparatus may configure a phase value 930 in the target RF chain in order to determine a phase state of the phase difference between the reference phase and the first phase. Here, the phase value 930 may be a phase value, which is obtained in the case where the phase value 920 is changed by a phase value corresponding to "+90°". Therefore, in the case where the phase corresponding to the phase value 930 is defined as the second phase, the second phase may be obtained by adding 90° to the first phase. The calibration apparatus may determine a sine value for the result obtained by subtracting the first phase from the reference phase in order to determine the phase state for the phase difference between the reference phase and the first phase. Since the sine value for the result obtained by subtracting the first phase from the reference phase is the same as the cosine value for the result obtained by subtracting the second phase (=first phase +90°) from the reference phase, the calibration apparatus may determine a sine value for the result obtained by subtracting the first phase from the reference phase, using <Equations 5> and <Equation 6>. The calibration apparatus may determine the phase state for the phase difference between the reference phase and the first phase, based on whether the sine value is greater than zero.

The calibration apparatus may calibrate the target RF chain based on the phase difference between the reference phase and the first phase and the phase state of the phase difference. For example, the calibration apparatus may increase or decrease, based on the phase state, the phase value 920 configured in the target RF chain by a phase value corresponding to the phase difference, so as to configure the phase value 910 in the target RF chain.

If an error occurs in the calibration, the phase value, which is estimated by the calibration apparatus as the optimal phase value, may not be the actual optimal phase value. Therefore, in order to compensate for the calibration error, the calibration apparatus may perform a fine search. According to various embodiments of the disclosure, "fine search" refers to performing calibration on a target RF chain by additionally considering phase values, which are within a preconfigured range from a phase value estimated as the optimal phase value.

Hereinafter, in FIG. 10, an operation of a calibration apparatus for performing fine search is described.

Figure 10:
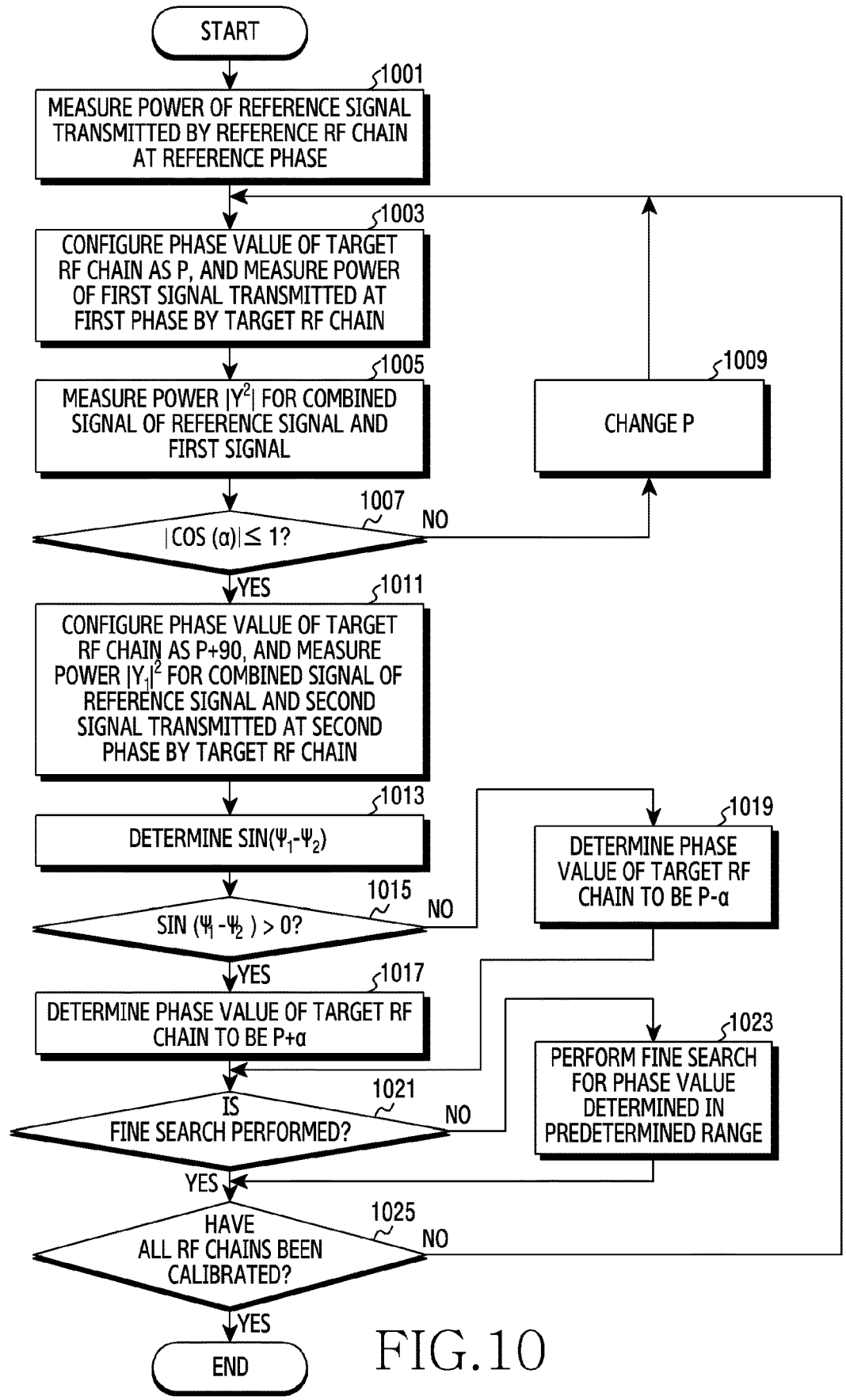
FIG. 10 is a flowchart illustrating an operation of a calibration apparatus for performing a fine search according to various embodiments of the disclosure.

FIG. 10 is a flowchart illustrating an operation of a calibration apparatus for performing fine search according to various embodiments of the disclosure. FIG. 10 illustrates an operation of the calibration apparatus 200. In FIG. 10, operations performed in operations 1001 to 1019 are the same as operations performed in operations 701 to 719, respectively.

In operation 1021, the calibration apparatus determines whether to perform the fine search. If the calibration apparatus does not perform the fine search, the calibration apparatus performs operation 1025.

If the calibration apparatus determines to perform the fine search, in operation 1023, the calibration apparatus performs the fine search on a phase value, which is determined in operations 1017 or 1019 in a preconfigured range, or a phase value estimated as the optimal phase value. In other words, the calibration apparatus determines at least one phase value, which is within a preconfigured range from the phase value estimated as the optimal phase value, and performs calibration of the target RF chain by additionally considering at least one phase value.

According to various embodiments of the disclosure, the fine search may include "maximum value-based search (max search)" and "minimum value-based search (min search)". The max search includes a process of determining a phase value for maximizing the power of the combined signal, from among phase values within a preconfigured range from a phase value estimated as the optimal phase value. To this end, the calibration apparatus may configure each of the phase values within the preconfigured range in the target RF chain and control the target RF chain to transmit a test signal at an initial phase corresponding to each configured phase value, so as to determine power for the combined signal between the reference signal and the test signal. In the case where a phase value for maximizing the power of the combined signal is the same as a phase value estimated as the optimal phase value, the calibration apparatus may determine, as the optimal phase value, the phase value estimated as the optimal phase value. On the other hand, in the case where a phase value for maximizing the power of the combined signal is different from a phase value estimated as the optimal phase value, the calibration apparatus may determine, as the optimal phase value, the phase value for maximizing the power of the combined signal. In other words, in the case where a phase value for maximizing the power of the combined signal is newly detected, the calibration apparatus may update the predetermined (or estimated) optimal phase value to the newly detected phase value.

The min search includes a process of determining a phase value, which minimizes the power of the combined signal, from among phase values within a preconfigured range from phase values that are different from the phase value, estimated as the optimal phase value, by a phase value corresponding to ±180°. To this end, the calibration apparatus may configure, in the target RF chain, each of the phase values within a preconfigured range, and control the target RF chain to transmit a test signal at an initial phase corresponding to each configured phase value, thereby determining power for the combined signal of the reference signal and the test signal. According to various embodiments of the disclosure, "a phase value which is different from another phase value by a phase value corresponding to ±180°" may be referred to as "an opposite phase value with respect to the another phase value".

As described above, if the reference phase of the reference signal is the same as the initial phase of the test signal, the power for the combined signal between the reference signal and the test signal may be maximized. On the contrary, if the initial phase of the test signal and the reference phase differ from each other by ±180°, the power for the combined signal between the reference signal and the test signal may be minimized. Thus, instead of determining the phase value of the target RF chain, which maximizes the power of the combined signal, the calibration apparatus may determine an opposite phase value with respect to a phase value of the target RF chain, which minimizes the power of the combined signal. If the phase value for minimizing the power of the combined signal is the same as the opposite phase value with respect to the optimal phase value, the calibration apparatus may determine the phase value, which is estimated as the optimal phase value, as the optimal phase value. On the other hand, if the phase value for minimizing the power of the combined signal is different from the phase value estimated as the optimal phase value, the calibration apparatus may determine an opposite phase value with respect to a phase value, which minimizes the power of the combined signal, as the optimal phase value. In other words, if a phase value for minimizing the power of the combined signal is newly detected, the calibration apparatus may update the predetermined (or estimated) optimal phase value to the opposite phase value with respect to the newly detected phase value.

A change in the power of the combined signal with respect to a change in the phase value, in a preconfigured range from the opposite phase value with respect to the optimal phase value, may be relatively more rapid than the change in the power of the combined signal with respect to the change in the phase value, in a preconfigured range from the optimal phase value. Thus, the calibration apparatus can more easily detect the optimal phase value using the min search.

In operation 1025, the calibration apparatus determines whether all RF chains have been calibrated. In other words, the calibration apparatus determines whether all RF chains included in the phased array antenna have been calibrated. If all RF chains have been calibrated, the calibration apparatus terminates this algorithm. If all RF chains are not calibrated, the calibration apparatus changes the target RF chain and repeats operations 1003 to 1023.

Hereinafter, in FIG. 11, the max search and the min search are described in more detail with a graph.

Figure 11:
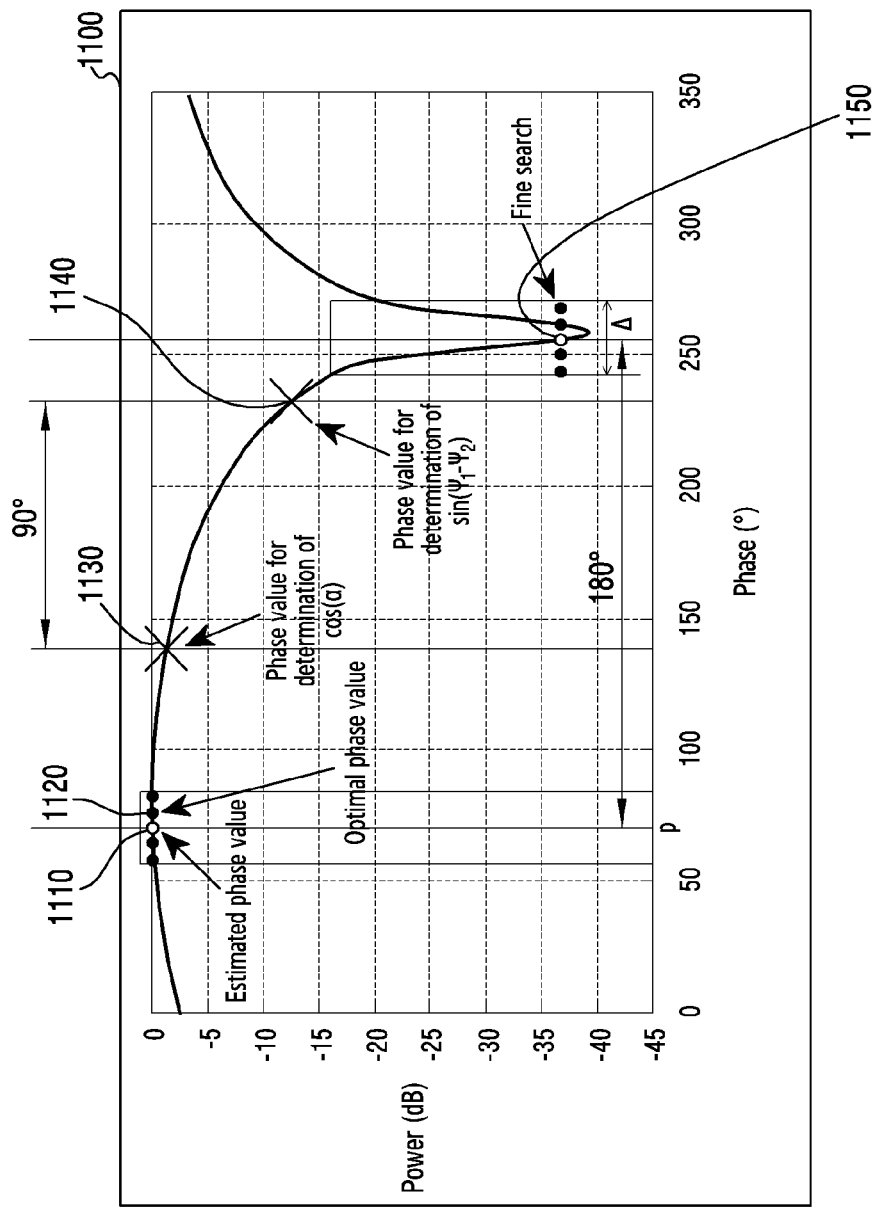
FIG. 11 is a graph illustrating a fine search for determining an optimal phase value according to various embodiments of the disclosure.

FIG. 11 illustrates a graph 1100 illustrating a fine search for determining an optimal phase value according to various embodiments of the disclosure. In a graph 1100, the horizontal axis represents a phase value in units of degrees, configured in a target RF chain, and the vertical axis represents power (dB units) for a combined signal of a reference signal transmitted by a reference RF chain and a test signal transmitted by the target RF chain.

According to the graph 1100, in the case where the max search is performed within a preconfigured range from a phase value 1110 (that is, the estimated phase value 1110) estimated as the optimal phase value, the optimal phase value 1120 may be determined. Here, the optimal phase value 1120 corresponds to a phase value that maximizes power for the combined signal of the test signal and the reference signal.

Alternatively, in the case where the min search is performed within a preconfigured range from an opposite phase value 1150 with respect to the estimated phase value 1110, an opposite phase value with respect to the optimal phase value 1120 may be determined. Here, the opposite phase value with respect to the optimal phase value 1120 corresponds to a phase value that minimizes the power for the combined signal of the test signal and the reference signal.

Referring to the graph 1100, a change in the combined signal power with respect to a change in the phase value, within a preconfigured range from the phase value 1150 for the max search is relatively greater than a change in the combined signal power with respect to a change in the phase value, in a preconfigured range from the phase value 1110 for the min search. Therefore, the calibration apparatus can more easily detect the change in the combined signal power during the min search process, and more easily detect an opposite phase value with respect to the optimal phase value 1120.

According to various embodiments of the disclosure, the phase value 1110 may be determined based on a phase difference between the reference phase and the initial phase of the test signal and a phase state of the phase difference. A phase value 1130 is a phase value for determining the phase difference and corresponds to the initial phase of the test signal. The phase value 1140 is a phase value for determining the phase state, and may correspond to a phase obtained in the case where the initial phase of the test signal is changed by "+90°". The calibration apparatus may calibrate a target RF chain based on the phase difference between the initial phase of the test signal and the reference phase and the phase state of the phase difference. For example, the calibration apparatus may increase or decrease, based on the phase state, the phase value 1130 configured in the target RF chain, by a phase value corresponding to the phase difference, and may configure the phase value 1110 in the target RF chain.

The calibration apparatus may perform calibration of the target RF chains while changing the target RF chain in a state of fixing the reference RF chain in the phased array antenna. However, if calibration is completed for any RF chain, the RF chain may serve as a reference RF chain for the calibration of another RF chain. In other words, the reference RF chain may be changed while calibrating the plurality of RF chains.

Hereinafter, in FIGS. 12A and 12B, operations of a calibration apparatus, which performs calibration by changing a reference RF chain, will be described.

Figure 12A:
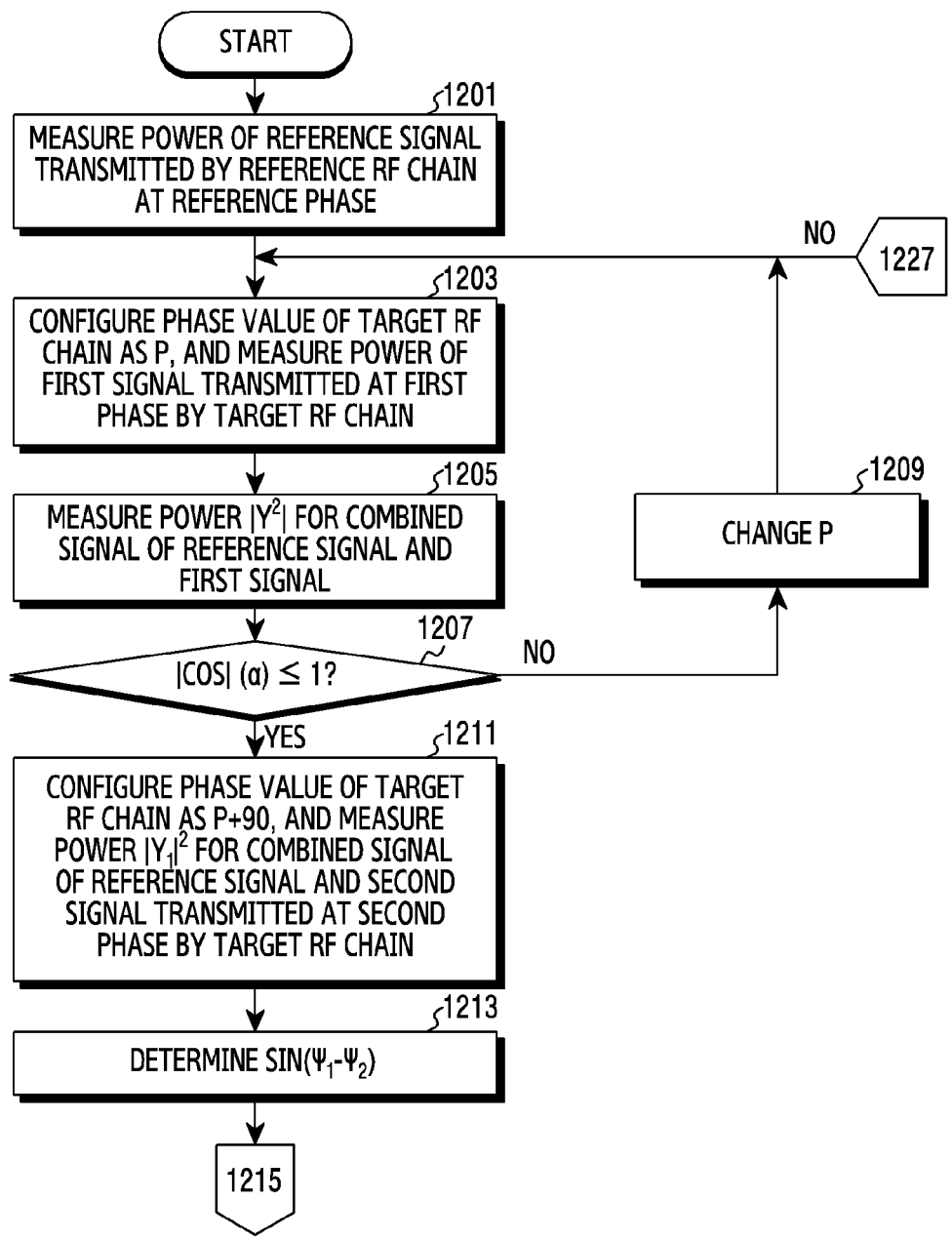
FIGS. 12A and 12B are flowcharts illustrating an operation of a calibration apparatus for performing calibration by changing a reference RF chain according to various embodiments of the disclosure.
Figure 12B:
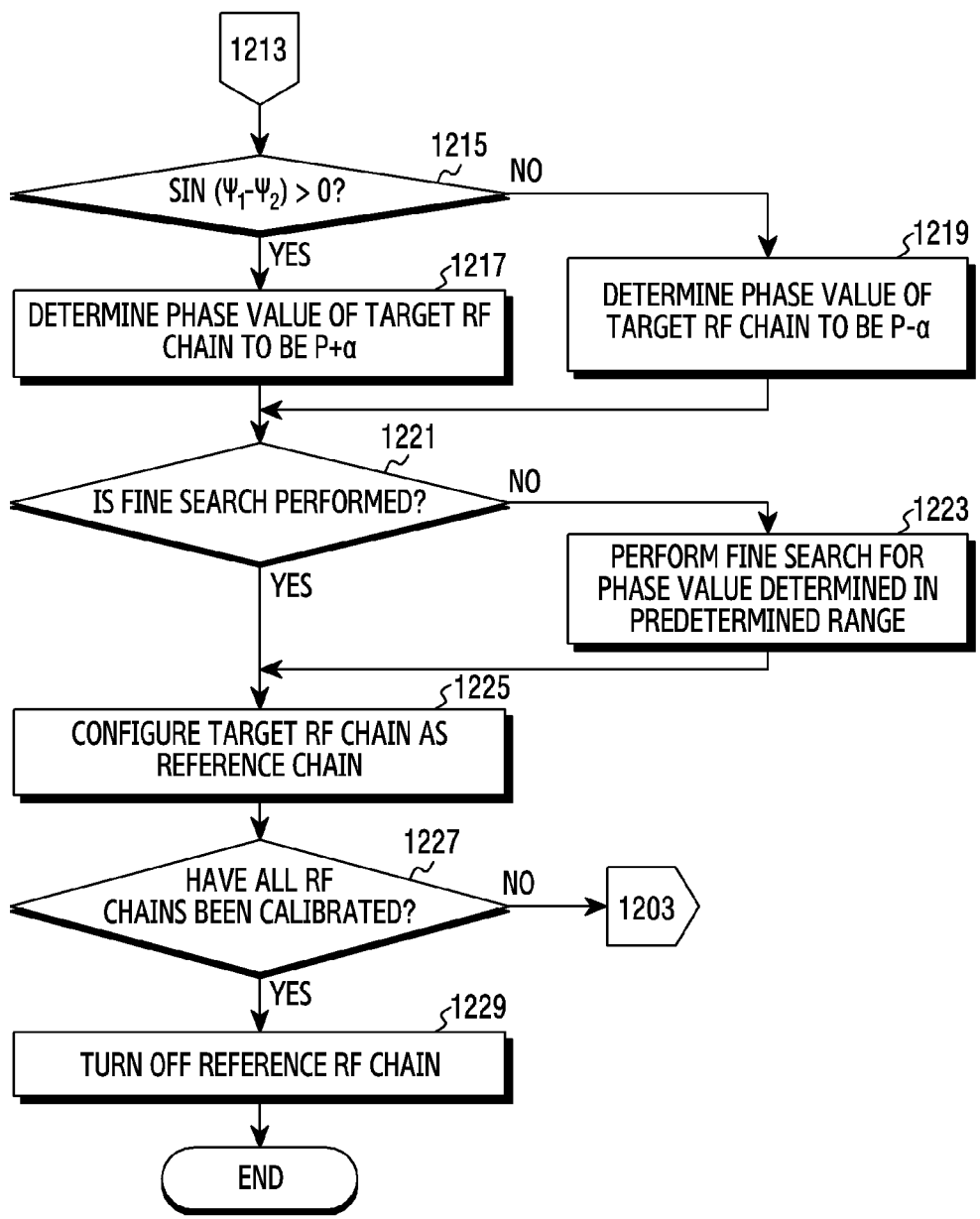

FIGS. 12A and 12B are flowcharts illustrating an operation of a calibration apparatus, which performs calibration by changing a reference RF chain, according to various embodiments of the disclosure. FIGS. 12A and 12B exemplify operations of the calibration apparatus 200. In FIGS. 12A and 12B, operations performed in operations 1201 to 1223 are the same as operations performed in operations 1001 to 1023, respectively.

In operation 1225, the calibration apparatus configures a target RF chain as a reference RF chain. In other words, since, through operations 1217, 1219, or 1223, the optimal phase value is configured in the target RF chain and calibration of the target RF chain is completed, the target RF chain may serve as a reference RF chain for calibration of another RF chain. Therefore, the calibration apparatus may configure the target RF chain as the reference RF chain for calibration of another RF chain.

In operation 1227, the calibration apparatus determines whether all RF chains have been calibrated. In other words, the calibration apparatus determines whether all RF chains included in the phased array antenna have been calibrated.

If all the RF chains are not calibrated, the calibration apparatus changes the target RF chain and repeats operations 1203 to 1225. At this time, the calibration apparatus performs calibration of the target RF chain using the reference RF chain configured in operation 1225.

If all RF chains have been calibrated, in operation 1229, the calibration apparatus turns off the reference RF chain. In other words, since all RF chains of the phased array antenna are calibrated so that there is no target RF chain requesting to use the reference RF chain, the calibration apparatus turns off the reference RF chain and terminates this algorithm.

Hereinafter, in FIG. 13, an effect obtained when calibrating a target RF chain based on a phase difference between a reference phase and an initial phase of a test signal and a phase state of the phase difference according to various embodiments of the disclosure will be described with a graph.

Figure 13:
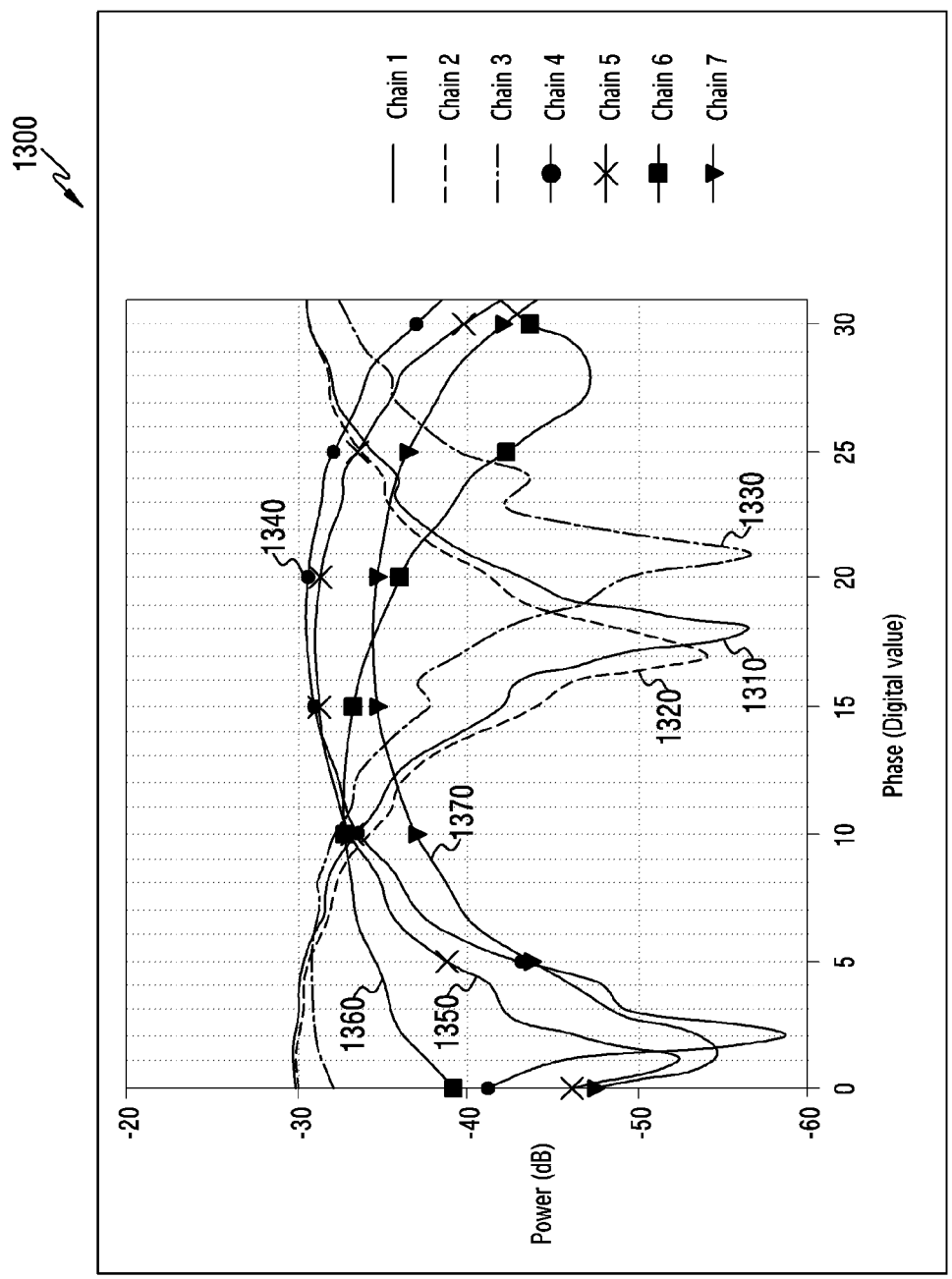
FIG. 13 is a graph illustrating an effect of calibration according to various embodiments of the disclosure.

FIG. 13 is a graph 1300 illustrating an effect of calibration according to various embodiments of the disclosure. In a graph 1300, the horizontal axis represents a phase value (a digital value represented by decimal number) configured in the target RF chain, and the vertical axis represents power (dB units) of a combined signal of a reference signal transmitted by a reference RF chain and a test signal transmitted by a target RF chain. In FIG. 13, it is assumed that a phased array antenna includes chains 0 to 7 (8 RF chains), and chain 0 is a reference RF chain in which phase value 0 is configured.

In the graph 1300, a curve 1310 shows a relationship between a phase value, configured in chain 1, and power for a combined signal transmitted from chain 0 and chain 1. A curve 1320 shows a relationship between a phase value, configured in chain 2, and power for a combined signal transmitted from chain 0 and chain 2. A curve 1330 shows a relationship between a phase value, configured in chain 3, and power for a combined signal transmitted from chain 0 and chain 3. A curve 1340 shows a relationship between a phase value, configured in chain 4, and power for a combined signal transmitted from chain 0 and chain 4. A curve 1350 shows a relationship between a phase value, config-ured in chain 5, and power for a combined signal transmitted from chain 0 and chain 5. A curve 1360 shows a relationship between a phase value, configured in chain 6, and power for a combined signal transmitted from chain 0 and chain 6. A curve 1370 shows a relationship between a phase value, configured in chain 7, and power for a combined signal transmitted from chain 0 and chain 7. In each of the curves 1310 to 1370, a phase value allowing the combined signal to have a maximum power is a phase value causing the reference phase and the initial phase of the test signal to be the same, and indicates an optimal phase value that needs to be configured in RF chains 1 to 7.

According to various embodiments of the disclosure, the calibration apparatus may determine the optimal phase value by determining power of a combined signal for all possible phase values of the respective chains 1 to 7. For example, the calibration apparatus may determine power of a combined signal for all possible phase values in chain 1 to identify a relationship such as the curve 1310, and may determine a phase value (i.e., the optimal phase value) that maximizes the power of the combined signal. Hereinafter, a method in which the calibration apparatus determines the optimal phase value by determining power of the combined signal for all possible phase values of the respective chains 1 to 7 is referred to as a first method. The optimal phase value for each RF chain, determined by the first method, may be the same as a phase value corresponding to the maximum power in the respective curves 1310 to 1370.

According to various embodiments of the disclosure, the calibration apparatus may determine an optimal phase value based on some phase values among all possible phase values of the respective chains 1 to 7. For example, the calibration apparatus may determine an optimal phase value that needs to be configured in chain 1, based on a phase value for determining the phase difference between the reference phase and the initial phase of the test signal transmitted from chain 1, and a phase value for determining a phase state of the phase difference. Hereinafter, a method in which the calibration apparatus determines the optimal phase value based on some phase values among all the possible phase values of the respective chains 1 to 7 is referred to as a second method.

The optimal phase value for each RF chain, determined by the first method, and the optimal phase value for each RF chain determined by the second method, are shown in <Table 1> below.

TABLE 1

| | Optimal phase value determined in each RF chain | | | | | | | | Calibration time |
|---|---|---|---|---|---|---|---|---|---|
| | Chain 0 | Chain 1 | Chain 2 | Chain 3 | Chain 4 | Chain 5 | Chain 6 | Chain 7 | |
| First method | 0 | 2 | 1 | 5 | 18 | 17 | 12 | 17 | 480 sec. |
| Second method | 0 | 1 | 1 | 4 | 17 | 17 | 12 | 18 | 30 sec. |

Referring to <table 1>, the optimal phase value for each RF chain, determined by the first method, and the optimal phase value for each RF chain, determined by the second method, are almost the same. However, a calibration time consumed in a calibration process corresponding to the second method is much less than a calibration time consumed in a calibration process corresponding to the first method. Therefore, the calibration apparatus according to various embodiments of the disclosure performs calibration of the target RF chain based on the phase difference between the reference phase and the initial phase of the test signal and the phase state of the phase difference, as in the second method, so as to reduce a time required for the calibration, and contribute to mass production of the phased array antenna.

The calibration apparatus may have the same configuration as the calibration apparatus 200 of FIG. 2 in order to calibrate the phased array antenna, but various modifications can be made to the configuration of the calibration apparatus. Hereinafter, the variations of the calibration apparatus is described with reference to FIGS. 14A to 14F.

FIGS. 14A to 14F illustrate variations of a calibration apparatus according to various embodiments of the disclosure. The term "~unit" or "~er" used hereinafter may refer to the unit for processing at least one function or operation and may be implemented in hardware, software, or a combination of hardware and software. Referring to FIGS. 14A to 14F, the calibration apparatus may have a configuration of one of calibration apparatuses 1410 to 1460.

Figure 14A:
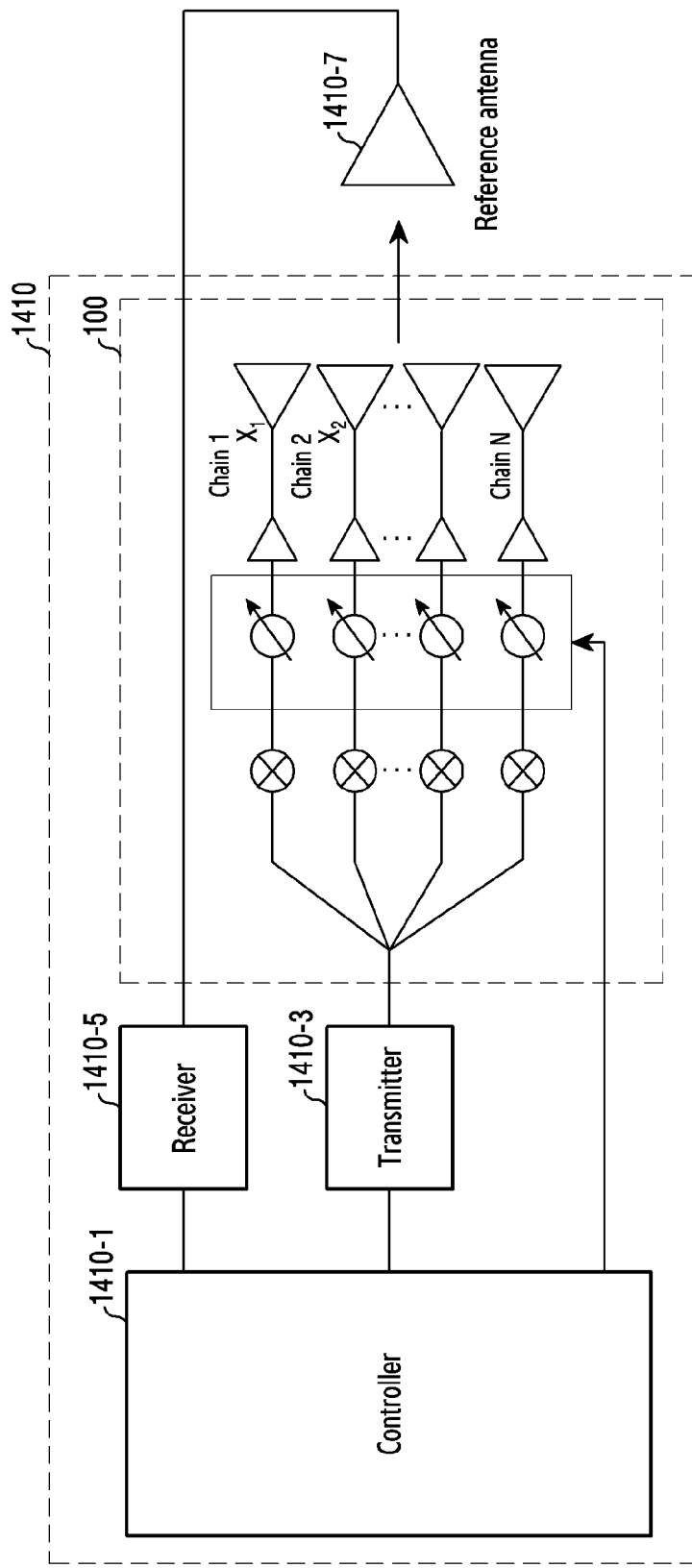
FIGS. 14A to 14F illustrate variations of a calibration apparatus according to various embodiments of the disclosure.

According to various embodiments of the disclosure, as shown in FIG. 14A, a calibration apparatus 1410 may include a controller 1410-1, a transmitter 1410-3, a receiver 1410-5, and a reference antenna 1410-7. Here, the controller 1410-1, the transmitter 1410-3, the receiver 1410-5, and the reference antenna 1410-7 may be elements of a device (hereinafter, referred to as a wireless communication device) configured to perform wireless communication using a phased array antenna (for example, a phased array antenna 100). In other words, the calibration apparatus 1410 is not separately implemented from the wireless communication device but may be implemented inside the wireless communication device. In this case, the wireless communication device may perform additional calibration, if necessary (e.g., if the temperature of the internal circuit of the wireless communication device has changed), for the phased array antenna for which calibration has already been performed.

According to various embodiments of the disclosure, a wireless communication device may include at least one of an electronic device, a terminal, "a user equipment (UE)", "a mobile station", "a subscriber station", "a remote terminal", "a wireless terminal", "a user device", "a base station", "an access point (AP)", "eNodeB (eNB)", "a 5$^{th}$ generation (5G) node", "a wireless point", "a transmission/reception point (TRP)", or other terms having the equivalent technical meaning thereof.

Figure 14B:
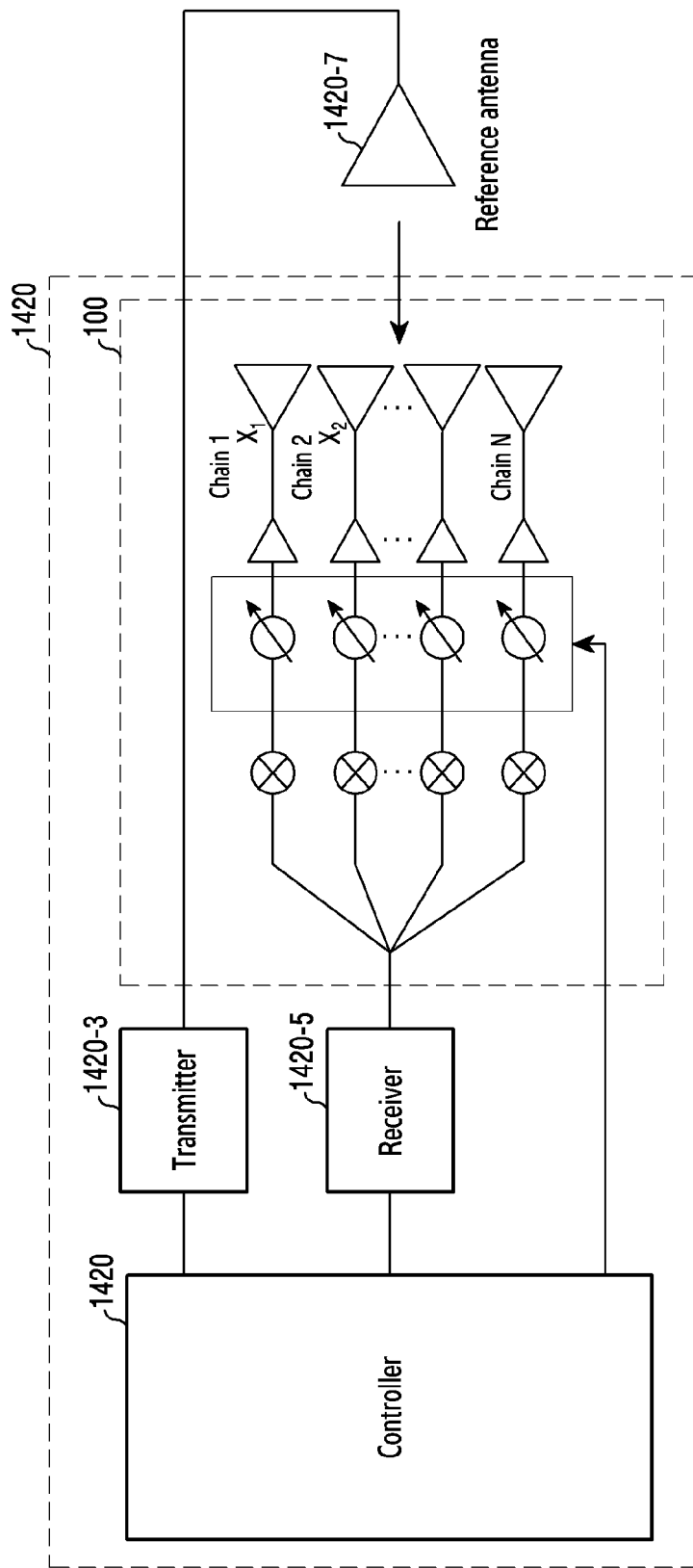

According to various embodiments of the disclosure, as shown in FIG. 14B, a calibration apparatus 1420 may include a controller 1420-1, a transmitter 1420-3, a receiver 1420-5, and a reference antenna 1420-7. According to various embodiments of the disclosure, instead of controlling each RF chain of the phased array antenna to transmit a signal, the calibration apparatus 1420 controls each RF chain of the phased array antenna to receive a signal, thereby enabling calibration of each RF chain. For example, the controller 1420-1 of the calibration apparatus 1420 may control the transmitter 1420-3 to transmit a calibration signal through the reference antenna 1420-7, and may control the receiver 1420-5 to receive a signal through the phased array antenna 100. More specifically, the calibration apparatus 1420 may control each reference RF chain and target RF chain to receive a calibration signal, and may determine a phase difference between an initial phase of a calibration signal received by the reference RF chain and an initial phase of a calibration signal received by the target RF chain. In addition, the calibration apparatus 1420 may change a phase value configured in the target RF chain, and control each reference RF chain and target RF chain to receive a calibration signal to determine a phase state with respect to the phase difference. The calibration apparatus 1420 may calibrate the target RF chain based on the phase difference and the phase state.

Figure 14C:
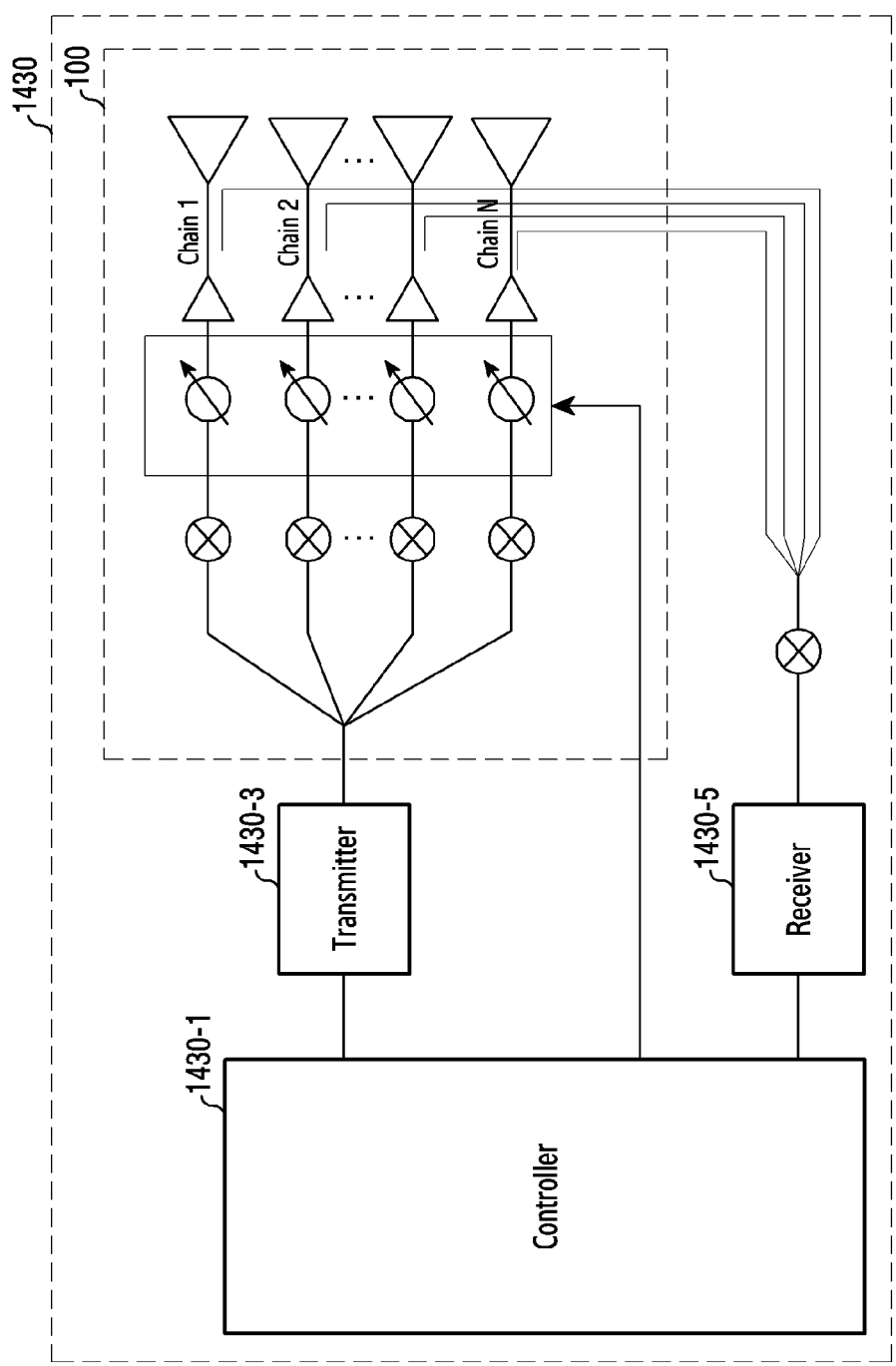

According to various embodiments of the disclosure, as shown in FIG. 14C, a calibration apparatus 1430 may include a controller 1430-1, a transmitter 1430-3, and a receiver 1430-5. The calibration apparatus 1430 may include, in order to perform calibration, a coupling circuit to directly receive through a coupling circuit a signal, a phase of which is converted by a phase shifter, instead of receiving a signal radiated from the at least one RF chain. For example, as shown in FIG. 14C, the coupling circuit may be configured to connect an output terminal of a power amplifier included in each RF chain and the receiver 1430-5.

Figure 14D:
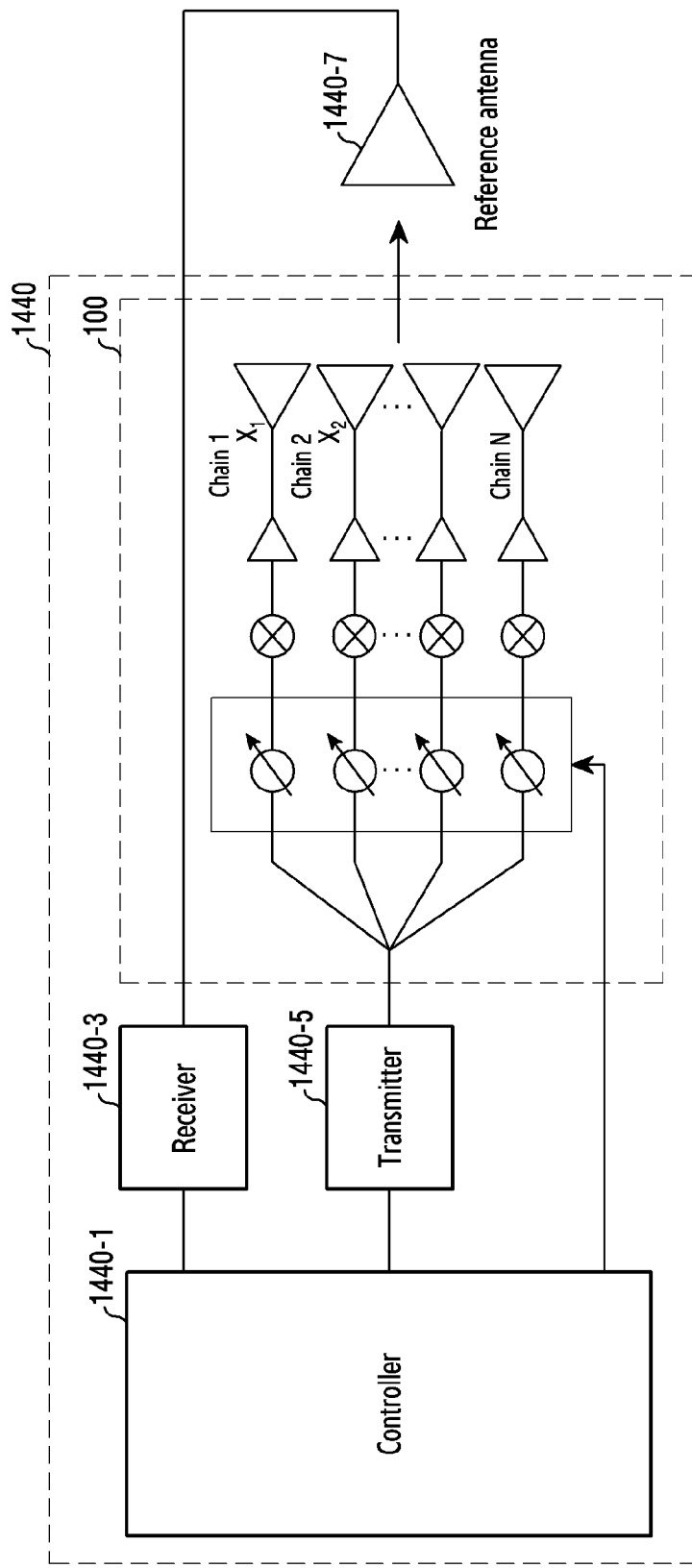

According to various embodiments of the disclosure, as shown in FIG. 14D, a calibration apparatus 1440 may include a controller 1440-1, a receiver 1440-3, a transmitter 1440-5, and a reference antenna 1440-7. As shown in FIG. 14D, the phase shifter of the phased array antenna 100 may be configured to convert the phase of an IF signal. In this case, the controller 1440-1 of the calibration apparatus 1440 may control the phase shifters of the phased array antenna 100 to convert the phase of a calibration signal, transmitted from the transmitter 1440-2, in an IF band.

Figure 14E:
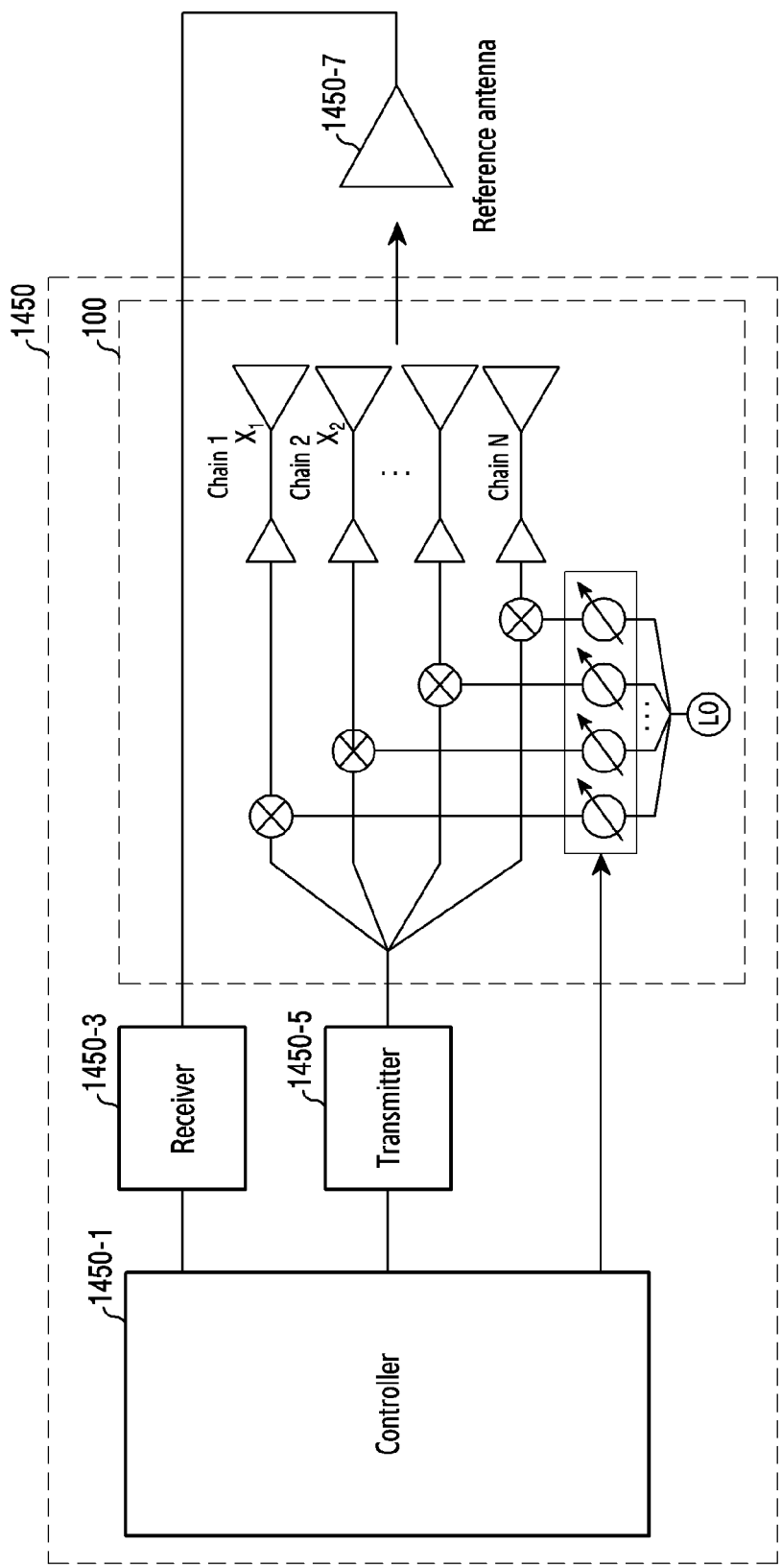

According to various embodiments of the disclosure, as shown in FIG. 14E, a calibration apparatus 1450 may include a controller 1450-1, a receiver 1450-3, a transmitter 1450-5, and a reference antenna 1450-7. As shown in FIG. 14E, the phase shifter of the phased array antenna 100 may be configured to convert the phase of an LO signal. In this case, the controller 1450-1 of the calibration apparatus 1450 may control phase shifters of the phased array antenna 100 to provide the phase-converted LO signals to a mixer of each RF chain. Since the phase change with respect to the LO signal has been reflected in the RF signal having been converted from the IF signal based on the phase-converted LO signal, the calibration apparatus 1450 may control the phase shifters configured to convert the phase of the LO signal and consequently convert the phase of a signal transmitted by each RF chain.

Figure 14F:
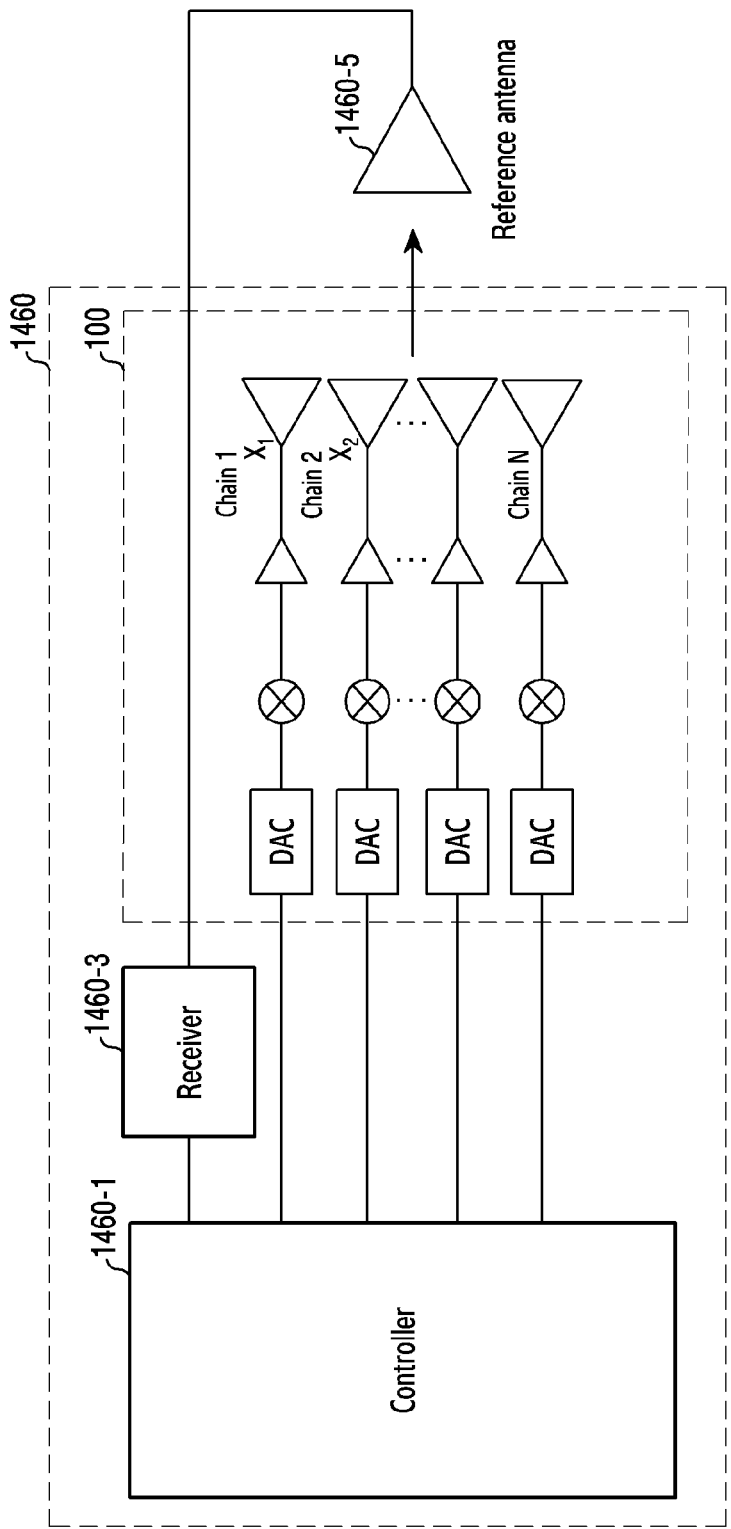

According to various embodiments of the disclosure, as shown in FIG. 14F, a calibration apparatus 1460 may include a controller 1460-1, a receiver 1460-3, and a reference antenna 1460-5. As shown in FIG. 14F, the phased array antenna 100 may include a digital to analog converter (DAC). The DAC may multiply the digital signal by a beamforming weight to perform beamforming on the digital signal, and convert the beamformed digital signal into an analog signal. Here, the beamforming weights are used to change the magnitude and/or phase of a signal, and may be referred to as a "precoding matrix", a "precoder", or the like. The calibration apparatus 1450 may control the DAC associated with each RF chain to enable the phase of a calibration signal to be changed for each RF chain, and consequently may convert the phase of a signal transmitted by each RF chain.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access a device for performing embodiments of the disclosure via an external port. Further, a separate storage device on the communication network may access a device for performing embodiments of the disclosure.

In the above-described detailed embodiments of the disclosure, a component included in the disclosure is expressed in the singular or the plural according to a proposed detailed embodiment. However, the singular form or plural form is selected for convenience of description suitable for the proposed situation, and various embodiments of the disclosure are not limited to a single element or multiple elements thereof. Further, either multiple elements expressed in the description may be configured as a single element or a single element in the description may be configured as multiple elements.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

The invention claimed is:

1. A method for calibrating a phased array antenna, the method comprising:
   determining a phase difference between a first phase and a reference phase by controlling a first radio frequency (RF) chain of a plurality of RF chains for the phased array antenna to transmit a first signal at a first phase;
   determining a phase state of the phase difference by controlling the first RF chain to transmit a second signal at a second phase which is different from the first phase as the phase difference, wherein the phase state is one of a state in which the first phase precedes the reference phase and a state in which the first phase is delayed relative to the reference phase; and
   calibrating the first RF chain based on the phase difference and the phase state,
   wherein the reference phase is a phase of a reference signal transmitted from a reference RF chain of the plurality of the RF chains, and
   wherein a power of the first signal corresponds to a power of the second signal.

2. The method of claim 1, wherein the determining of the phase difference comprises:
   determining a power of the reference signal;
   determining the power of the first signal;
   measuring a power for a combined signal of the reference signal and the first signal; and
   determining the phase difference based on the power of the reference signal, the power of the first signal, and the power for the combined signal.

3. The method of claim 1, wherein the determining of the phase state comprises:
   determining power for a combined signal of the reference signal and the second signal;
   determining the phase state to be a state in which the reference phase is delayed relative to the first phase in a case where the power for the combined signal of the reference signal and the second signal is greater than the power for the combined signal of the reference signal and the first signal; and
   determining the phase state to be a state in which the reference phase precedes the first phase in a case where the power for the combined signal of the reference signal and the second signal is smaller than the power for the combined signal of the reference signal and the first signal, and
   wherein the second phase is obtained by subtracting the phase difference from the first phase.

4. The method of claim 1, wherein the determining of the phase state comprises:
   determining a power for a combined signal of the reference signal and the second signal;
   determining the phase state to be a state in which the reference phase precedes the first phase in a case where the power for the combined signal of the reference signal and the second signal is greater than the power for the combined signal of the reference signal and the first signal; and
   determining the phase state to be a state in which the reference phase is delayed relative to the first phase in a case where the power for the combined signal of the reference signal and the second signal is smaller than the power for the combined signal of the reference signal and the first signal, and
   wherein the second phase is obtained by adding the phase difference to the first phase.

5. The method of claim 1, wherein the calibrating of the first RF chain comprises:
   determining an optimal phase value of the first RF chain, to cause an initial phase of a signal transmitted by the first RF chain and the reference phase to be equal to each other.

6. The method of claim 5, further comprising:
   determining the optimal phase value by determining a result obtained by adding or subtracting the phase difference to or from the first phase, based on the phase state,
   wherein the optimal phase value is configured as a phase value corresponding to the result.

7. The method of claim 5, further comprising:
   determining one or more phase values within a preconfigured range from the optimal phase value;
   determining a power for a combined signal of the reference signal and a third signal by controlling the first RF chain to transmit a third signal at a phase corresponding to each of the one or more phase values; and
   updating the optimal phase value based on the power for the combined signal.

8. The method of claim 5, further comprising:
determining an opposite phase value with respect to the optimal phase value;
determining one or more phase values within a preconfigured range from the opposite phase value;
determining power for a combined signal of the reference signal and a third signal by controlling the first RF chain to transmit a third signal at a phase corresponding to each of the one or more phase values; and
updating the optimal phase value based on the power for the combined signal.

9. The method of claim 5, further comprising:
determining a phase difference between a third phase and a phase corresponding to the optimal phase value by controlling a third RF chain to transmit a third signal at the third phase; and
calibrating the third RF chain based on the phase difference between the third phase and the phase corresponding to the optimal phase value.

10. The method of claim 1, wherein determining the phase difference comprises:
determining a sine value relating to a result obtained by subtracting the first phase from the reference phase;
in a case that the sine value is positive, determining the phase state to be a state in which the reference phase precedes the first phase; and
determining the phase state to be a state in which the reference phase is delayed relative to the first phase in a case that the sine value is negative, and
wherein the second phase is obtained by adding an orthogonal phase to the first phase.

11. An apparatus for calibrating a phased array antenna, the apparatus comprising a controller configured to:
determine a phase difference between a first phase and a reference phase by controlling a first radio frequency (RF) chain of a plurality of RF chains for the phased array antenna to transmit a first signal at a first phase;
determine a phase state of the phase difference by controlling the first RF chain to transmit a second signal at a second phase which is different from the first phase as the phase difference, wherein the phase state is one of a state in which the first phase precedes the reference phase and a state in which the first phase is delayed than the reference phase; and
calibrate the first RF chain based on the phase difference and the phase state,
wherein the reference phase is a phase of a reference signal transmitted from a reference RF chain of the plurality of the RF chains, and
wherein a power of the first signal corresponds to a power of the second signal.

12. The apparatus of claim 11, wherein the controller is further configured to:
determine a power of the reference signal;
determine the power of the first signal;
measure a power for a combined signal of the reference signal and the first signal; and
determine the phase difference based on the power of the reference signal, the power of the first signal, and the power for the combined signal.

13. The apparatus of claim 11, wherein the controller is further configured to:
determine a power for a combined signal of the reference signal and the second signal,
determine the phase state to be a state in which the reference phase is delayed relative to the first phase in a case where the power for the combined signal of the reference signal and the second signal is greater than a power for a combined signal of the reference signal and the first signal; and
determine the phase state to be a state in which the reference phase precedes (leads) the first phase in a case where the power for the combined signal of the reference signal and the second signal is smaller than the power for the combined signal of the reference signal and the first signal, and
wherein the second phase is obtained by subtracting the phase difference from the first phase.

14. The apparatus of claim 11, wherein the controller is further configured to:
determine a power for a combined signal of the reference signal and the second signal;
determine the phase state to be a state in which the reference phase precedes the first phase in case that the power for the combined signal of the reference signal and the second signal is greater than power of a combined signal of the reference signal and the first signal; and
determine the phase state to be a state in which the reference phase is delayed relative to the first phase in case that the power of the combined signal of the reference signal and the second signal is smaller than the power of the combined signal of the reference signal and the first signal, and
wherein the second phase is obtained by adding the phase difference to the first phase.

15. The apparatus of claim 11, wherein the controller is further configured to:
determine a sine value relating to a result obtained by subtracting the first phase from the reference phase;
in a case that the sine value is positive, determine the phase state to be a state in which the reference phase precedes the first phase; and
determine the phase state to be a state in which the reference phase is delayed relative to the first phase in a case that the sine value is negative,
wherein the second phase is obtained by adding an orthogonal phase to the first phase.

16. The apparatus of claim 11, wherein the controller is further configured to: determine an optimal phase value of the first RF chain, to cause an initial phase of a signal transmitted by the first RF chain and the reference phase to be equal to each other.

17. The apparatus of claim 16, wherein the controller is further configured to: determine the optimal phase value by determining a result obtained by adding or subtracting the phase difference to or from the first phase, based on the phase state, and
wherein the optimal phase value is configured as a phase value corresponding to the result.

18. The apparatus of claim 16, wherein the controller is further configured to:
determine one or more phase values within a preconfigured range from the optimal phase value;
determine power for a combined signal of the reference signal and a third signal by controlling the first RF chain to transmit a third signal at a phase corresponding to each of the one or more phase values; and
update the optimal phase value based on the power for the combined signal.

19. The apparatus of claim 16, wherein the controller is further configured to:
determine an opposite phase value with respect to the optimal phase value;

determine one or more phase values within a preconfigured range from the opposite phase value;

determine power for a combined signal of the reference signal and a third signal by controlling the first RF chain to transmit a third signal at a phase corresponding to each of the one or more phase values; and update the optimal phase value based on the power for the combined signal.

20. The apparatus of claim 16, wherein the controller is further configured to:

determine a phase difference between a third phase and a phase corresponding to the optimal phase value by controlling a third RF chain to transmit a third signal at the third phase; and calibrate the third RF chain based on the phase difference between the third phase and the phase corresponding to the optimal phase value.

* * * * *